United States Patent
Nishikawa

(10) Patent No.: US 6,587,222 B2
(45) Date of Patent: *Jul. 1, 2003

(54) IMAGE PROCESSING APPARATUS FOR CONVERTING IMAGE DATA IN ACCORDANCE WITH CHARACTERISTICS OF AN IMAGE OBTAINED AT THE TIME OF EXPANSION

(75) Inventor: Naoyuki Nishikawa, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/740,510

(22) Filed: Oct. 30, 1996

(65) Prior Publication Data

US 2003/0011793 A1 Jan. 16, 2003

(30) Foreign Application Priority Data

Oct. 31, 1995 (JP) ............................................. 7-283741

(51) Int. Cl.$^7$ ............................................... G06F 15/00
(52) U.S. Cl. ....................................... 358/1.9; 358/1.15
(58) Field of Search .......................... 395/102; 382/270, 382/271, 272, 273, 298, 299, 167, 261, 233; 358/518, 523, 1.2, 1.15, 1.9, 1.16, 527, 462; 348/405, 404, 403, 403.1, 404.1, 405.1

(56) References Cited

U.S. PATENT DOCUMENTS

| 5,253,041 | A | * | 10/1993 | Wine et al. .................. 348/448 |
| 5,309,526 | A | * | 5/1994 | Pappas et al. ............... 382/237 |
| 5,333,211 | A | * | 7/1994 | Kanda et al. ................ 382/261 |
| 5,392,076 | A | * | 2/1995 | Fujiwara ...................... 348/719 |
| 5,416,606 | A | * | 5/1995 | Katayama et al. ........... 358/467 |
| H1589 | H | * | 9/1996 | Rosenthal .................... 348/384 |
| 5,757,976 | A | * | 5/1998 | Shu ............................. 382/252 |
| 5,764,296 | A | * | 6/1998 | Shin ............................ 348/405 |
| 5,911,007 | A |   | 6/1999 | Miyake ....................... 382/233 |

* cited by examiner

Primary Examiner—Gabriel Garcia
(74) Attorney, Agent, or Firm—Fitzpatrick, Cella, Harper & Scinto

(57) ABSTRACT

Although dither processing is a high-speed process, it raises conflicts in improvement of resolution and improvement of tonality because of the structure of the dither matrix. Dither processing which is an image-matching-type is available to solve the above problem by analyzing frequency components in a partial area of an image, however, this method further causes a problem in long processing time. The present invention is provided to solve the above problems. When compressed image data 411 is expanded and processing to match an output device is performed, plural types of binarization processes are selectively utilized in accordance with the frequency component data of an image obtained at the time of the expansion process.

5 Claims, 21 Drawing Sheets

FIG. 7A
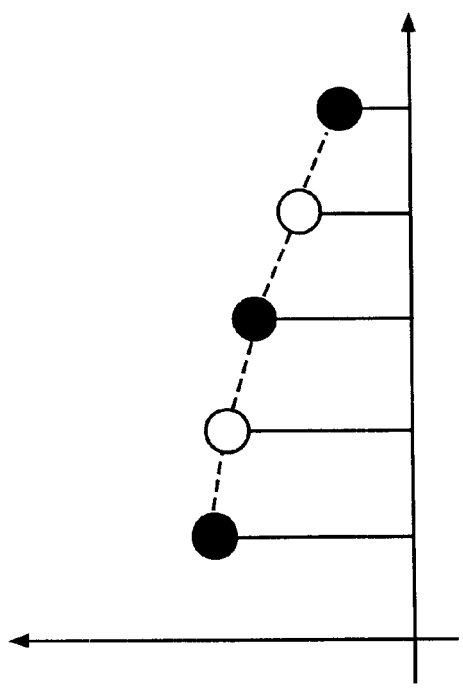
INTERPOLATION METHOD 543
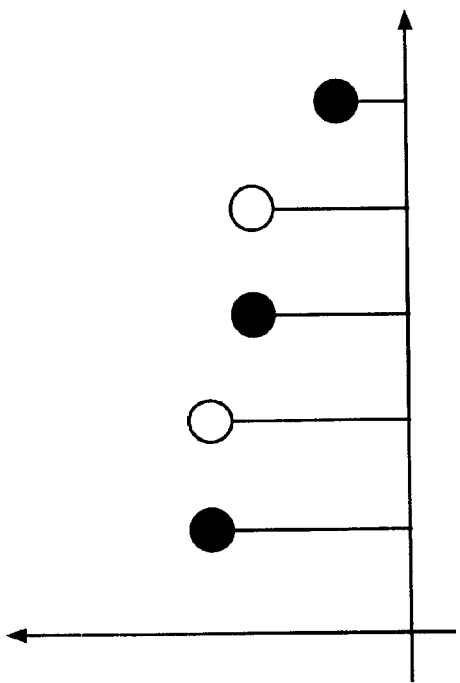
INTERPOLATION METHOD 542

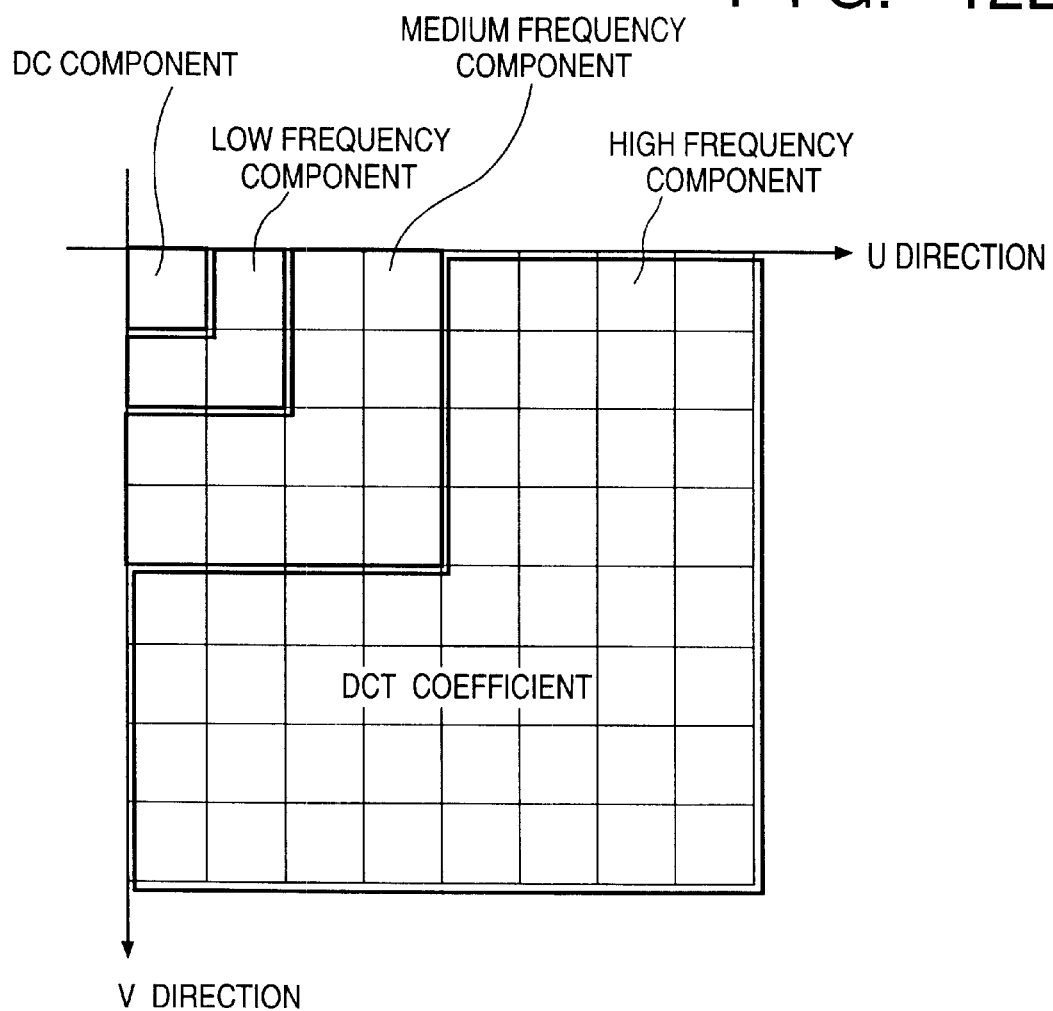

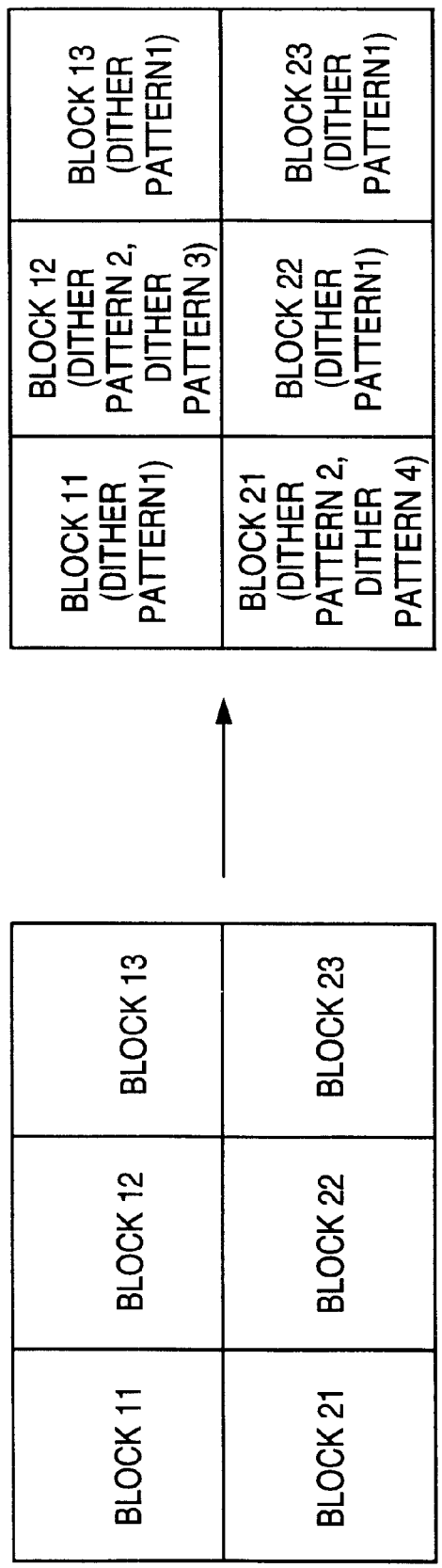

IMAGE PROCESSING APPARATUS FOR CONVERTING IMAGE DATA IN ACCORDANCE WITH CHARACTERISTICS OF AN IMAGE OBTAINED AT THE TIME OF EXPANSION

BACKGROUND OF THE INVENTION

Present invention relates to an image processing apparatus and method thereof and, more particularly, to an image processing apparatus and method for expanding coded image data and performing a process appropriate for the characteristics of an image, as well as a computer-readable memory.

Various methods have been suggested lately for realizing effective image compression by mapping an image in a frequency region and performing appropriate quantization and encoding for each frequency component. Particularly popular method of image compression is image-matching-type image compression which is a combination of discrete cosine transformation (DCT) and Huffman coding, and which is adopted as an international standard. The "image-matching-type image compression" performs image processing suitable for an image type (e.g., natural image, CG, character-oriented/line-oriented image or the like). Along with recent penetration of color image systems, such technique for image compression is often utilized for compressing a color image with high quality (high resolution).

Among the general color image systems, particularly, the wide-use of a color printing system adopting an ink-jet color printer is known. Such color image system often applies color printing operation where a high-resolution color image is compressed and stored in a disk device (file system), and the compressed data is expanded as necessary, resulting in rapid improvement in the color printing system. Since memory capacity of the file system is limited, image compression processing is essential to color image system so long as increase in memory capacity leads to increase in cost.

However, the above described technique raises the following problems.

One of the factors which determines quality of an output image in a color image system, including a binary color output device such as the above described ink-jet color printer or the like, is the method of processing full-color image data into pseudo half-tone image data, that is, a binarization method.

For binarization methods, a dither method, an error diffusion method and the like are available, each of which is utilized depending upon the desired image quality or the processing speed. Generally, the error diffusion method is used for generating a high quality (high resolution) image but notorious for long processing time. The dither method is capable of high-speed processing, but known to provide a problem of conflicts in improvement of resolution and improvement of tonality because of the structure of the dither matrix. Although an image-matching-type dither processing for analyzing frequency components in a partial area of an image is provided to solve the foregoing problem raised by the dither method, the problem of long processing time still remains.

SUMMARY OF THE INVENTION

The present invention has been made in consideration of the above situation, and has as its object to solve the foregoing problems.

It is an object of the present invention to provide an image processing apparatus and method thereof which can obtain high-quality image data in a short period of time.

Particularly, it is an object of the present invention to perform resolution conversion or quantization processing in high quality and high speed.

According to the present invention, the foregoing object is attained by providing an image processing apparatus comprising: expansion means for expanding coded image data; storage means for storing data indicative of characteristics of an image obtained at the time of the expansion processing performed by said expansion means; first conversion means for performing resolution conversion on the image data, expanded by said expansion means, in accordance with the data indicative of the characteristics; and second conversion means for quantizing the image data, on which the resolution conversion is performed, in accordance with the data indicative of the characteristics.

Moreover, according to the present invention, the foregoing object is attained by providing an image processing apparatus comprising: expansion means for expanding coded image data; storage means for storing data indicative of characteristics of an image obtained at the time of the expansion processing performed by said expansion means; and process means for performing quantization processing on the image data expanded by said expansion means, in accordance with the data indicative of the characteristics.

Another object of the present invention is to perform color conversion processing in high quality and high speed.

According to the present invention, the foregoing object is attained by providing an image processing apparatus comprising: expansion means for expanding coded image data; storage means for storing data indicative of characteristics of an image obtained at the time of the expansion processing performed by said expansion means; and process means for performing color conversion processing on the image data expanded by said expansion means, in accordance with the data indicative of the characteristics.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7A is a graph for describing an example of interpolation methods 542 and 543 shown in FIG. 6;

FIG. 12B is a view showing generation of low resolution image data based on compressed image data;

FIG. 15B is a diagram showing generation of the most appropriate image in each block by a dither pattern being selected and combined by utilizing the binarization processing shown in FIG. 15A;

DETAILED DESCRIPTION OF THE PREFERRED EMBODIMENTS

Preferred embodiments of the present invention will be described in detail in accordance with the accompanying drawings.

The image data processing described below is realized by a CPU in a computer executing a processing program stored in a memory medium such as a ROM in a computer or a diskette, with the use of a work memory such as a RAM or the like. The processing described below can also be executed by supplying the foregoing processing program to a personal computer or a work-station comprising a CPU and a RAM, as a matter of course.

Figure 1:
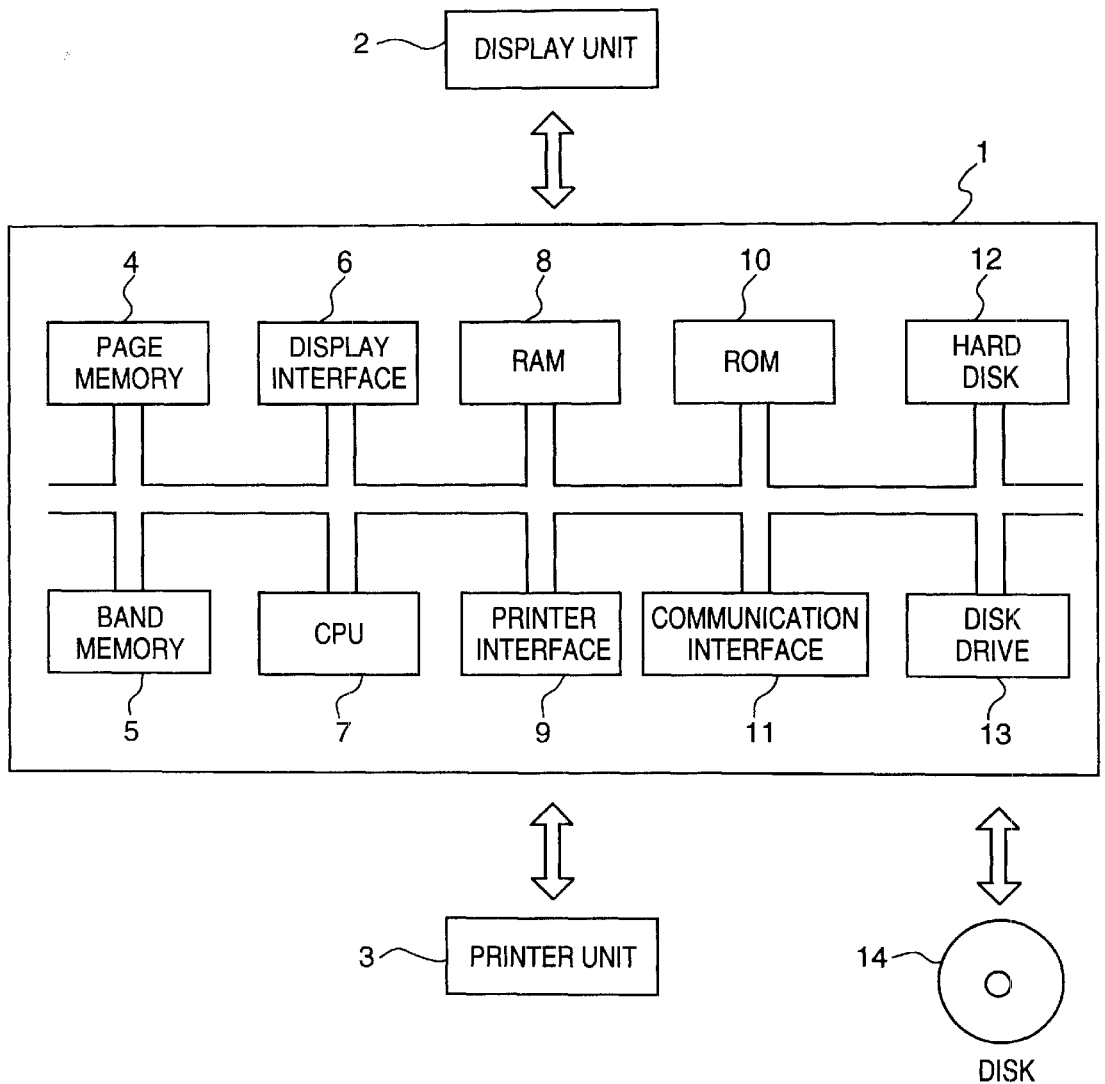
FIG. 1 is a block diagram showing an image processing apparatus which can employ the present invention.

An example of an image processing apparatus which can employ the present invention is shown in FIG. 1.

In FIG. 1, reference numeral 1 denotes a computer e.g. a personal computer, a work-station or the like; 2, a display unit connectable to the computer 1; 3, a printer unit connectable to the computer 1; 4, a page memory for storing at least one page of uncompressed image data; 5, a band memory for storing uncompressed image data for the number of lines corresponding to recording operation of the printer; 6, a display interface for supplying image data to be displayed on the display unit 2; 7, a CPU for executing operations that realize image processing described later; 8, a RAM utilized as a work memory; 9, a printer interface for supplying image data to the printer unit 3 to be printed; 10, a ROM for storing programs or the like for enabling the CPU 7 to execute image processing which will be described later; 11, a communication interface for performing communication with other computers or the like; 12, hard disk for storing programs executed by the CPU and data utilized by the CPU; and 13, a disk drive for inputting data stored in a removable memory medium 14, e.g. CD ROM or the like, into the computer 1.

<Basic Image Processing>

Basic image processing performed by a color image system according to the present invention will be now described.

Figure 2A:
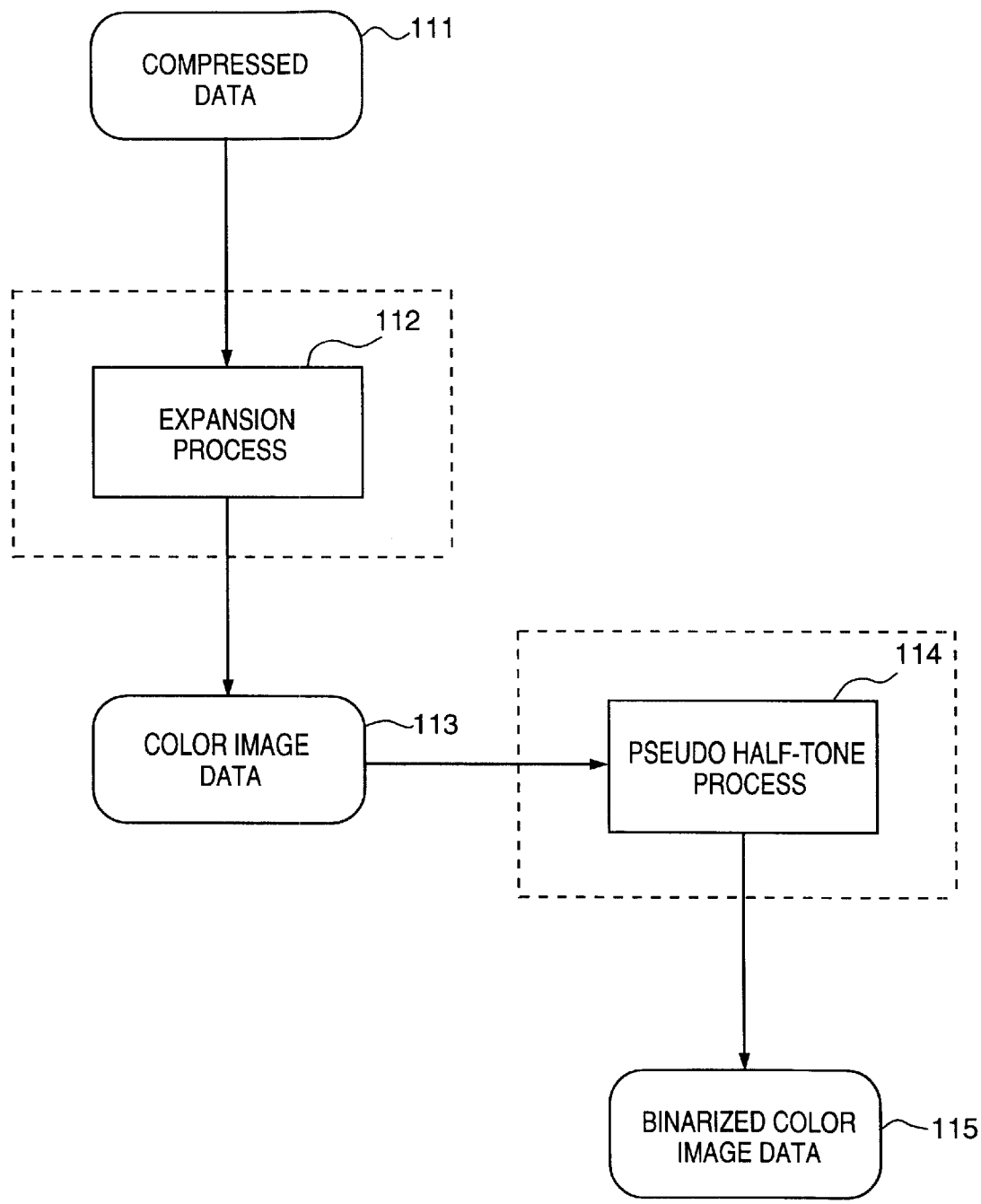
FIG. 2A is a block diagram showing a processing procedure for outputting compressed color image data to a color output device for outputting binary information.

Generally, when compressed color image data is to be outputted to a color output device for outputting binary information (e.g., ink-jet color printer, LED color printer or the like), expansion processing is first necessary to expand the compressed color image data, whereupon further processing is necessary, where a large amount of the expanded color data is temporarily stored in a file system or the like and binarization processing which will be described later is performed, to obtain an output image. FIG. 2A shows a processing procedure of outputting compressed color image data to a color output device for outputting binary information. Compressed data 111 denoting compressed color image data is restored into color image data 113 by expansion process 112. The color image data 113 is then binarized for each of color components and the pseudo half-tone process is performed by a pseudo half-tone process 114, thereafter transformed into binarized color image data 115.

Figure 2B:
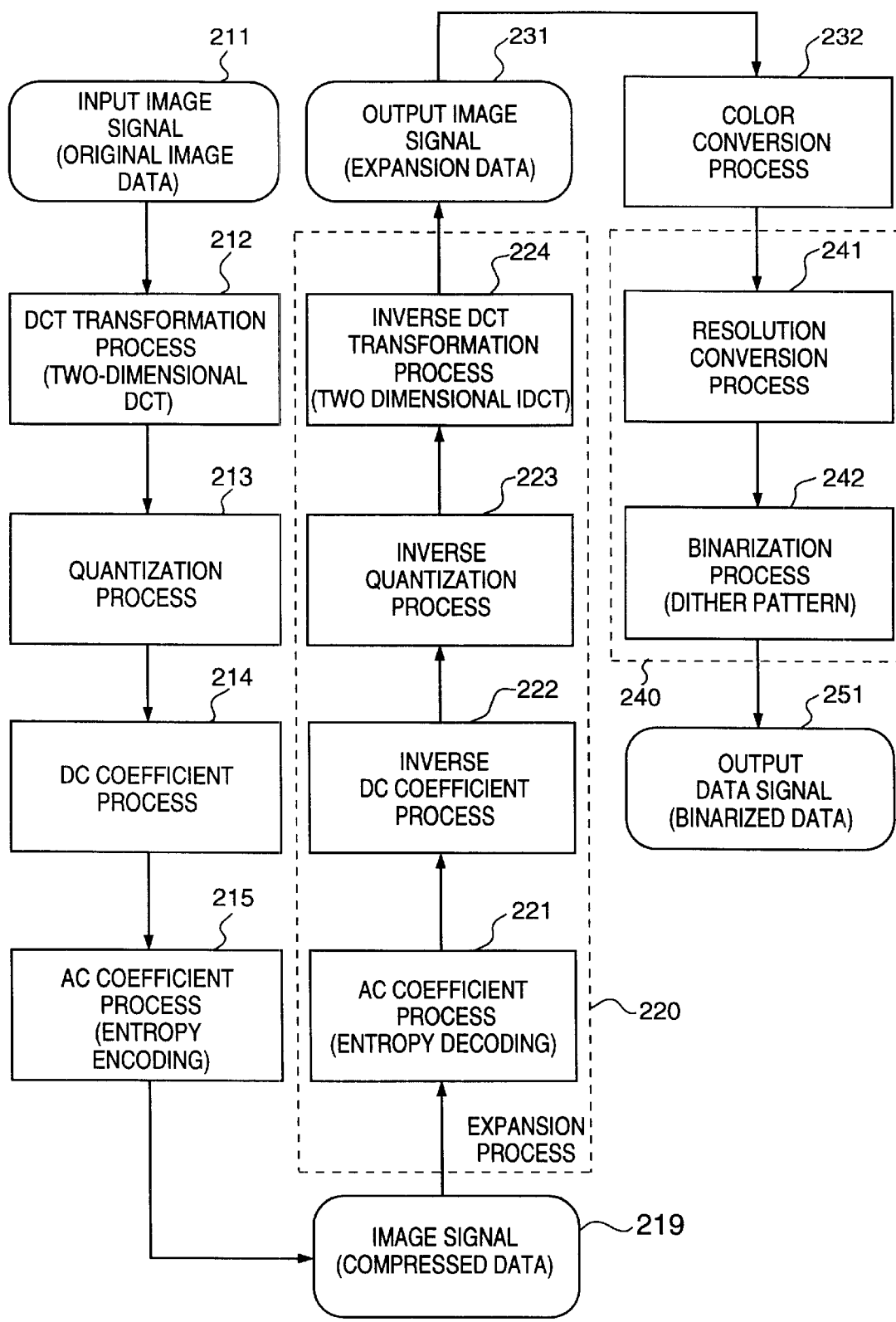
FIG. 2B is a block diagram describing the process shown in FIG. 2A further in detail.

FIG. 2B describes the process shown in FIG. 2A further in detail. The compressed data 111, expansion process 112, color image data 113, pseudo half-tone process 114, binarized color image data 115 indicated in FIG. 2A respectively correspond with compressed data 219, expansion process 220, expansion data 231, pseudo half-tone process 240 and binarized data 251 indicated in FIG. 2B.

In FIG. 2B, original image data 211 indicative of color image data is transformed into frequency component data (orthogonal transformation coefficients) in a unit of 8×8 pixel blocks, for each color-component plane by a DCT transformation process 212, and quantized as appropriate by a quantization process 213 for each of the frequency components. A DC coefficient indicative of the direct current component of the frequency component data is converted to a difference value between a preceding block and the succeeding block by utilizing a DC coefficient process 214. An AC coefficient indicative of the alternating current component of the frequency component data is subjected to entropy encoding by an AC coefficient process 215. A group of the above described data constitutes the compressed data 219.

Note that the compressed data 219 may be generated by the CPU 7 of the computer 1 shown in FIG. 1, or may be supplied externally via the communication interface 11 or disk drive 13.

The compressed data 219 obtained as a result of the foregoing series of processing is expanded as necessary and outputted. More particularly, an AC coefficient for quantization is obtained by performing entropy decoding in an AC coefficient process 221 included in the expansion process 220, and a DC coefficient of a block of interest is obtained from a preceding block and a succeeding block, by utilizing an inverse DC coefficient process 222. The expansion data 231 denoting color image data is obtained from a group of the quantization data obtained in the foregoing manner, by utilizing an inverse quantization process 223 and an inverse DCT transformation process 224.

The expansion data 231 obtained in the above described manner is mapped (e.g. transformed from R, G and B data into Y, M, C and K data) in a color space suitable for printing by utilizing a color conversion process 232, enlarged (or reduced) by resolution conversion process 241 to match with a print resolution, and transformed into binarized data 251 by an binarization process 242.

Figure 3:
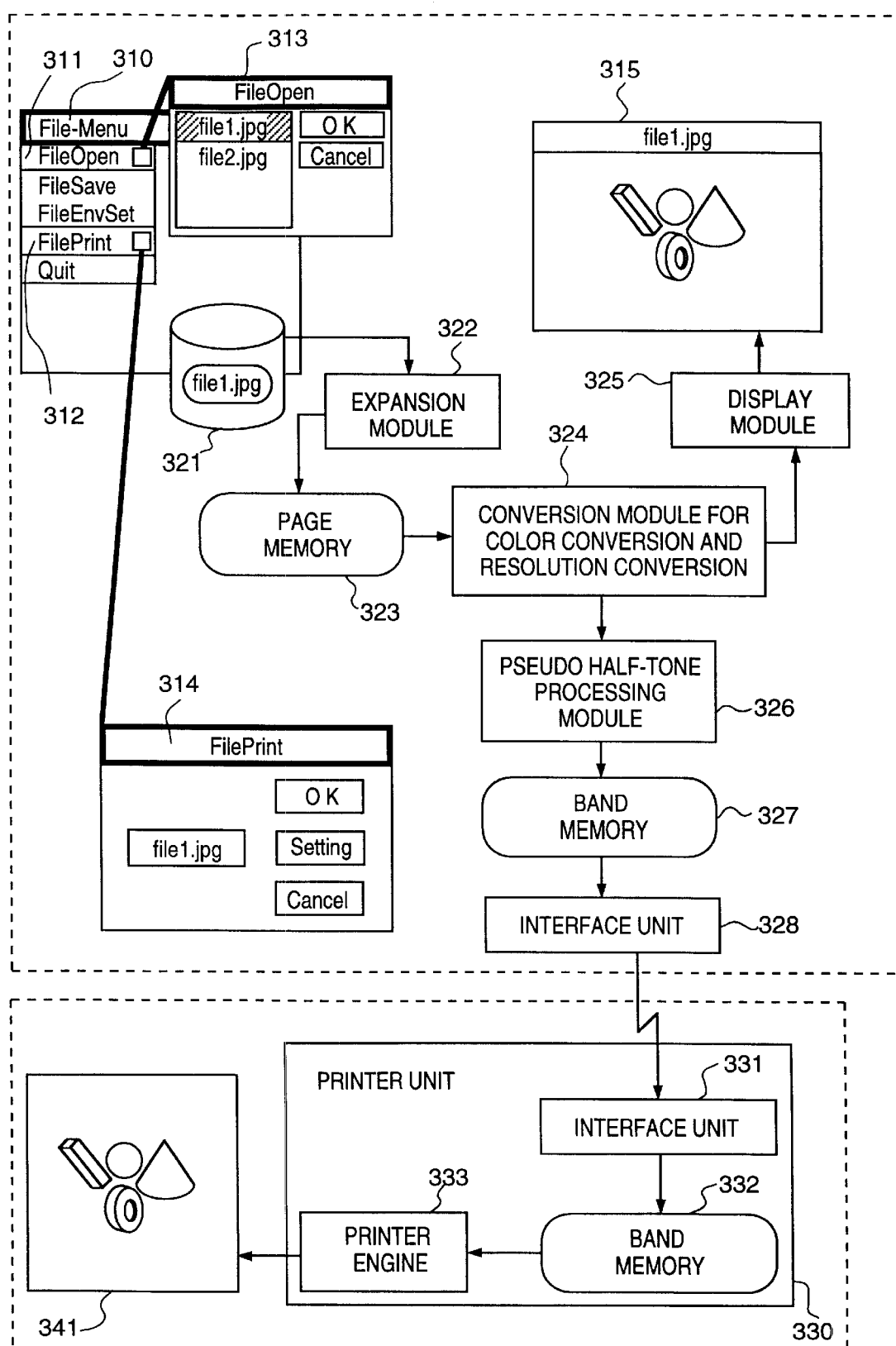
FIG. 3 is a conceptualized block diagram showing an image processing procedure in a color image system utilizing an application software.

FIG. 3 is a conceptualized diagram showing an image processing procedure in a color image system utilizing an application software.

In FIG. 3, a file operation menu (File-Menu) 310 in a window displayed on a display unit includes a file-open designation menu (FileOpen) 311 and a file-print designation menu (FilePrint) 312. When the file open designation menu 311 is selected, a file-open dialogue (FileOpen) 313 is opened, and the designated file is loaded from a file system 321 (corresponding to hard disk in FIG. 1) by designating a file name listed in the dialogue. Note that when a file is loaded, a window 315 indicating an image of the file appears on the display unit 2.

The process taking place inside the system is indicated by reference numeral 322 to 325 in FIG. 3. That is, the designated file "file1.jpg" loaded from the file system 321 is expanded by an expansion module 322, and the expanded image data is temporarily stored in a page memory 323 (corresponding to the page memory 4 in FIG. 1). The image data stored in the page memory 323 is reduced (or enlarged) by a resolution conversion module 324 to match with resolution of the display unit 2, and the reduced (or enlarged) image data is displayed in the window 315 by a display module 325. The foregoing processing is executed by the CPU 7.

When the image data is to be printed, the image data is displayed by the operation described above, whereupon a user selects the file-open designation menu 312 to open a file-print dialogue (FilePrint) 314 on the display unit 2. Since the dialog 314 indicates a currently-open file name, depressing an OK button will immediately start printing operation of the image data (which has been expanded and stored in the page memory 323) corresponding to the open file.

The process taking place inside the system is indicated by reference numeral 322 to 327. That is, the image data expanded and stored temporarily in the page memory 323 in the above described processing is enlarged (or reduced) by the resolution conversion module 324 to match with print resolution of a printer, binarized for each color component by a pseudo half-tone processing module 326 and stored in a band memory 327 (corresponding to the band memory 5 in FIG. 1). The image data stored in the band memory 327 is sequentially transmitted to an interface unit 331 in a printer unit 330 (corresponding to the printer unit 3 in FIG. 1) by an interface unit 328 (corresponding to the printer interface 9 in FIG. 1), and stored in a band memory 332 by the interface unit 331. A printer engine 333 prints a color image print 341 by reading out the image data from the band memory 332 as necessary.

In the above described color image system, a binarization method utilized in the pseudo half-tone process 114 in FIG. 2A or in the binarization process 242 in FIG. 2B or in the pseudo half-tone processing module 326 in FIG. 3 would become the main factor to decide quality of an output image.

<Color Printer>

Figure 4:
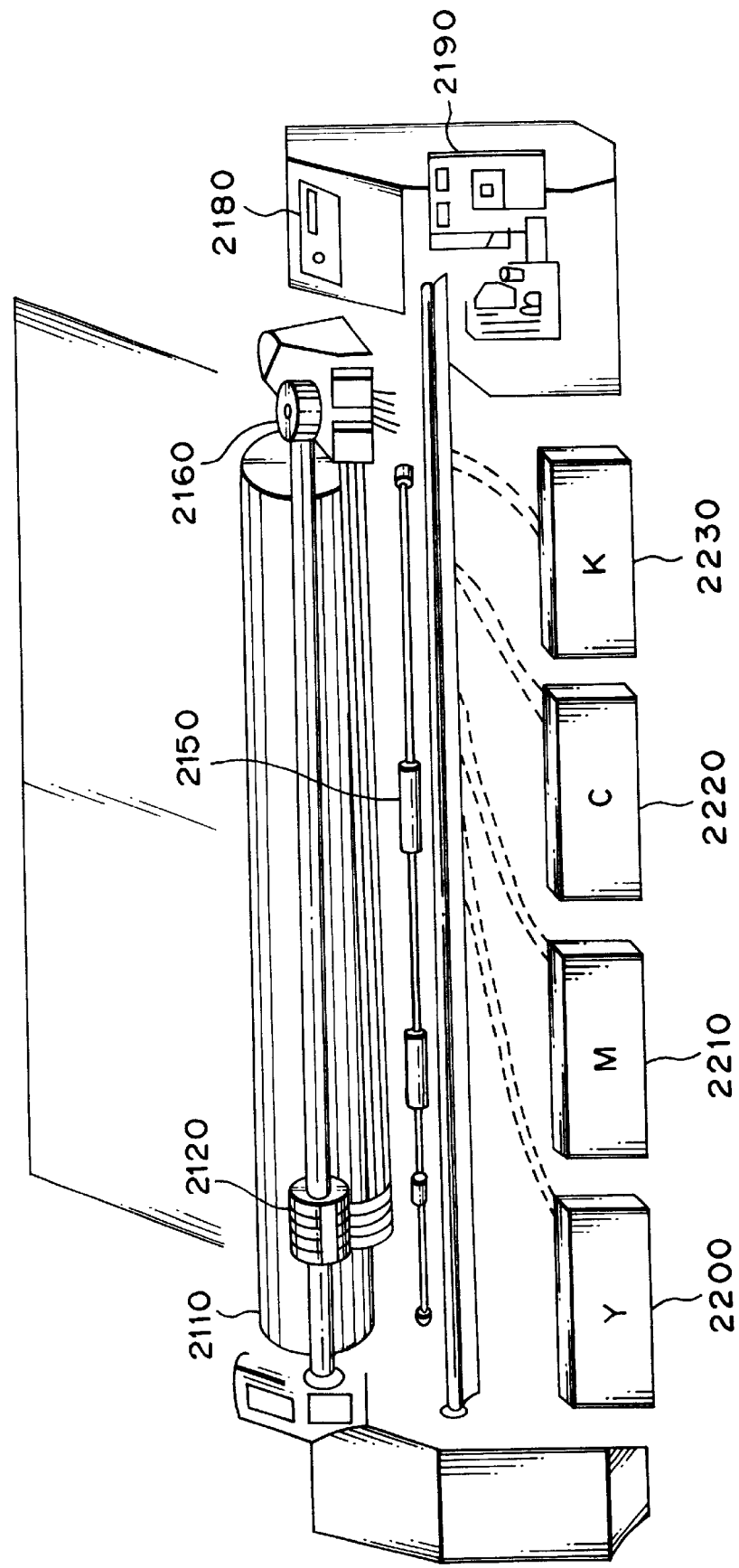
FIG. 4 is a drawing showing a structure of a color printer which employs the present invention.

FIG. 4 is a schematic view showing a structure of a color printer (corresponding to the printer unit 3 in FIG. 1) which employs the present invention.

In FIG. 4, reference numeral 2200 to 2230 denote color ink cartridges each of which is filled with yellow ink (Y), magenta ink (M), cyan ink (C) and black ink (K) respectively. Each of the ink cartridge and a pressure pump 2160 are independently connected with a pipe for supplying ink so that each of the color ink is sent from the pressure pump 2160 to the printhead 2120 with a fixed pressure.

A recording sheet is supplied from the rear portion of the color printer 2010 being held with a platen 2110 and a front guide roller 2150.

The operation of the color printer 2010 is performed by depressing keys on a control panel 2180, and a control board 2190 controls all the operation taking place in the color printer 2010.

When printing operation is to be performed by the color printer 2010, a print control command and data to be printed are sent to the control board 2190 via an interface (not shown). For instance, assuming R, G and B are designated in a color designation command, the control board 2190 which has received the print control command and print data, converts the R, G and B data to Y, M, C and K data and drives the printhead 2120 for printing.

Hereinafter, an image processing apparatus according to the present invention will be described in detail with reference to the accompanying drawings.

[First Embodiment]

<Overall Processing>

Overall image processing in a color image system of the first embodiment according to the present invention will be described.

According to image processing of the first embodiment, when a compressed image is expanded and binarized, frequency component data generated at the time of image compression is utilized as a reference in binarization processing, thereby achieving high quality and high speed image outputting.

Figure 5:
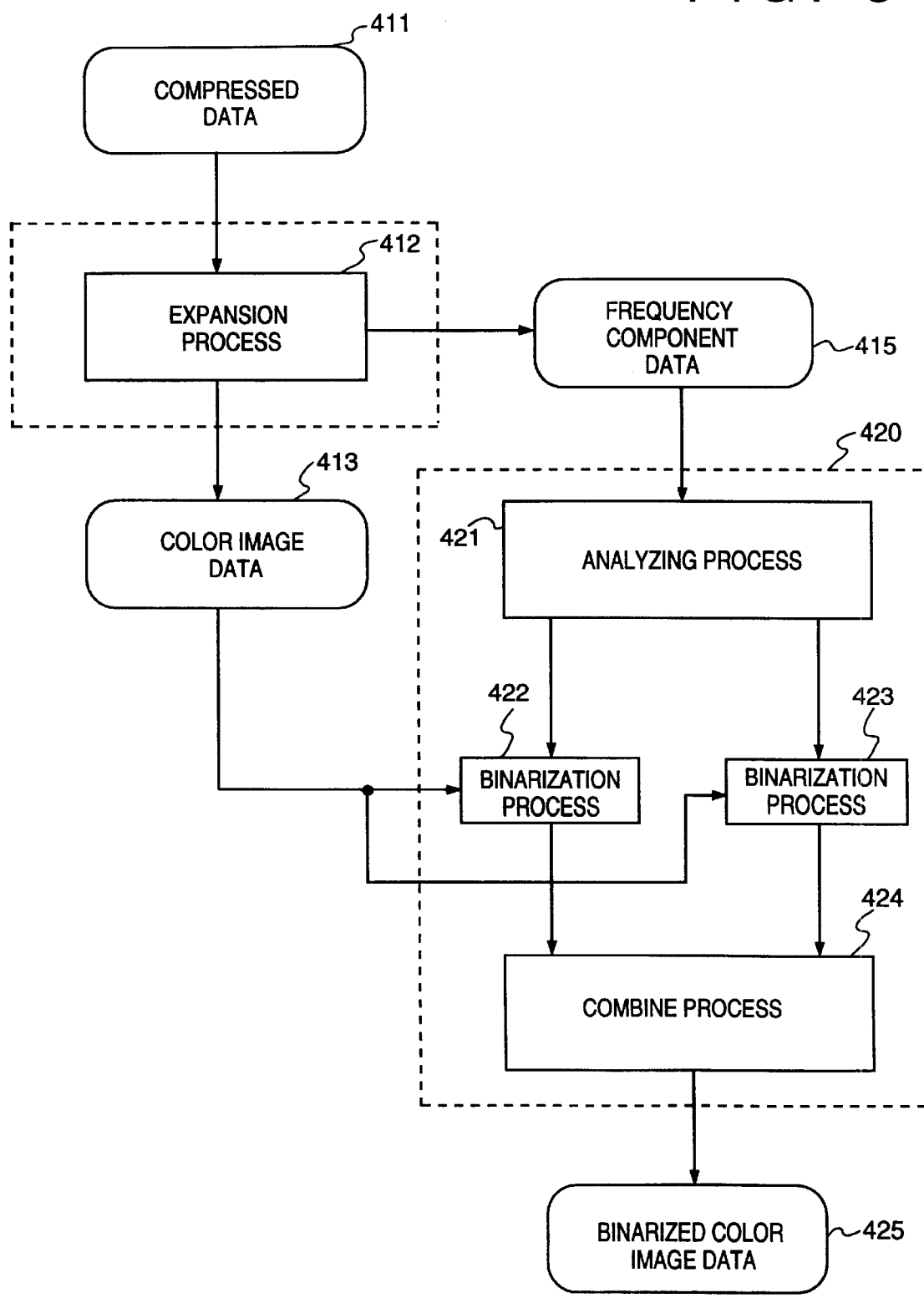
FIG. 5 is a block diagram showing overall image processing in the color image system according to a first embodiment of the present invention.

FIG. 5 shows overall image processing performed by the color system of the first embodiment. Compressed data 411 indicative of compressed color image data is restored into color image data 413 by an expansion process 412, and frequency component data 415 is generated. The frequency component data 415 is input to a unit executing an analyzing process 421, and a binarization process 422 or a binarization process 423 is selectively performed for a specified region (block or the like) in accordance with the analysis result.

By virtue of the binarization process selected as appropriate in the above manner, the most appropriate processing for each region is performed on the restored color image data 413. The image data being processed in a unit of a region is combined by a combine process 424, and outputted as binarized color image data 425 corresponding to one page.

Figure 6:
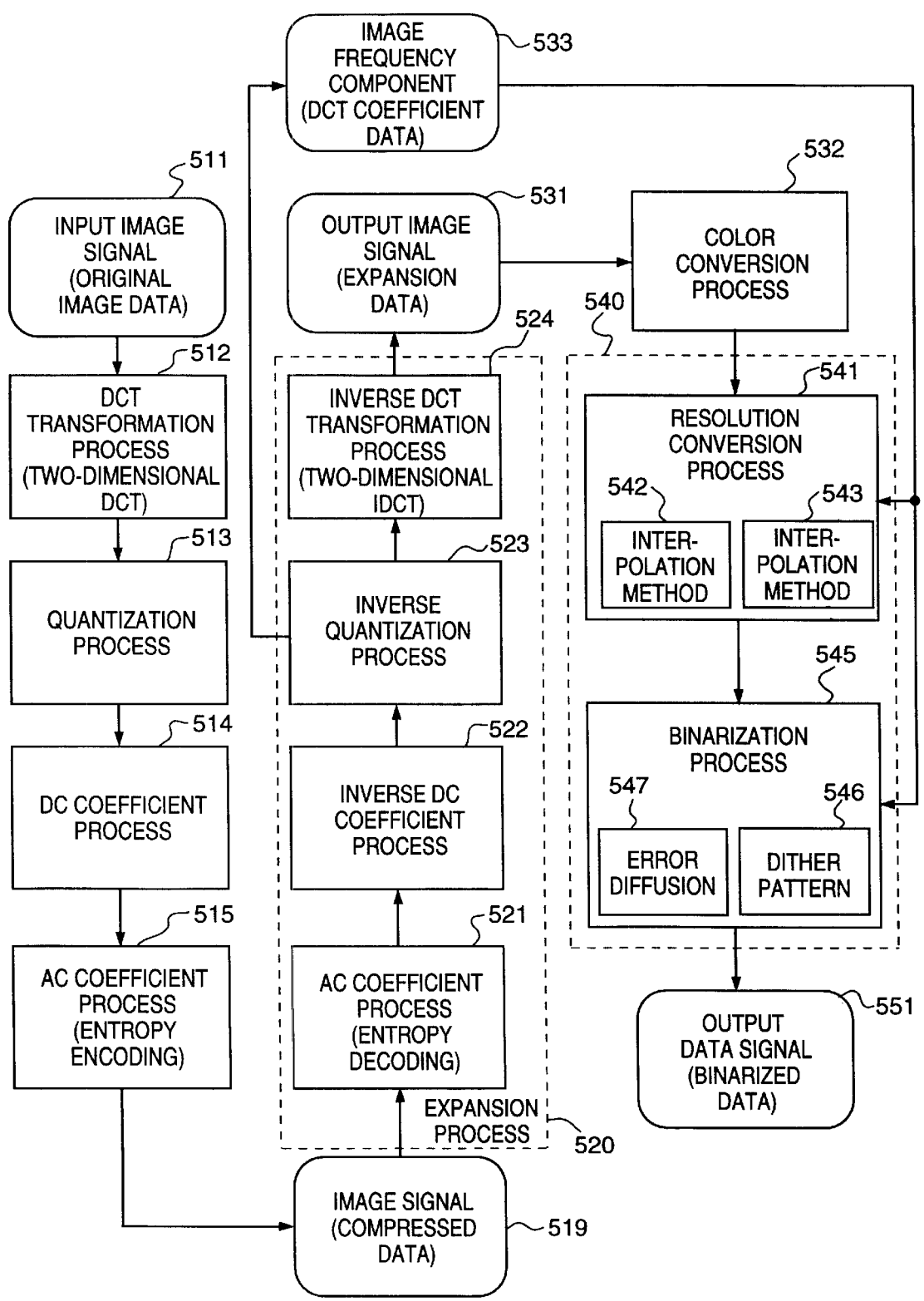
FIG. 6 is a functional block diagram showing processing in the color image system according to the present embodiment.

FIG. 6 is a functional block diagram showing an example of processing performed by the color image system according to the present embodiment, and illustrating the procedure of input color image data being compressed, binarized and output.

In FIG. 6, original image data 511 where each of the color components has 8 bit is transformed into frequency component data in a unit of, for instance, 4×4 pixel blocks, for each color-component plane, by a DCT transformation process 512. Assuming that a function indicating the original image is i(x, y) and a corresponding DCT function is I(u, v), the transformation equation can be defined as follows:

$$I(u, v) = \frac{2c(u)}{N}\frac{2c(v)}{N}\sum_{x=0}^{N}\sum_{y=0}^{N} i(x, y)\cdot\cos\{(2x+1)u\pi/2N\}\cdot\cos\{(2y+1)v\pi/2N\} \quad (1)$$

where
$0 \leq u, v \leq N-1$
$c(u)=c(v)=1\sqrt{2}$ where $u,v=0$
$c(u)=c(v)=1$ where $u,v=1,2,\ldots,N-1$ Next, the data is quantized for each of the frequency components by a quantization process 513. Note the quantization process includes scaling where, for example, 8 bit are quantized to 4 bit. A DC coefficient indicative of the direct current component of the frequency component data is converted to a difference value between a preceding block and the succeeding block by utilizing a DC coefficient process 514. An AC coefficient indicative of the alternating current component of the frequency component data is subjected to entropy encoding by an AC coefficient process 515. A group of the above described data constitutes compressed data 519.

The compressed data 519 obtained in the foregoing process is stored in a memory device, or expanded, or output, as necessary. The expansion process is now described in detail.

The compressed data 519 input into a unit executing an expansion process 520 is subjected to entropy decoding by an inverse AC coefficient process 521 to obtain a quantization AC coefficient. A DC coefficient of a block of interest is then obtained by an inverse DC coefficient process 522 on the basis of a difference value of a preceding block and the succeeding block. A group of quantization data is inversely quantized (or inversely scaled) by an inverse quantization process 523. A resultant frequency component for each region is outputted to a file as an image frequency component 533. The group of frequency component data obtained by the inverse quantization processing is mapped in a spatial region by an inverse DCT transformation process 524 and expansion data 531 indicative of color image data is obtained.

The expansion data 531 obtained in the foregoing manner is mapped in, for instance, a color space (e.g., from a space for R, G and B colors to a space for Y, M, C, and K colors) suitable for printing by a color conversion process 532, enlarged (or reduced) to match with e.g., a print resolution, by a resolution conversion process 541, and transformed into binarized data 551 indicative of pseudo half-tone color image data by binarization process 545. At this point, the resolution conversion process 541 and the binarization process 545, which performs density-preserving type quantization processing, change an interpolation method and a binarization method for each region in accordance with the image frequency component data 533.

If a memory (RAM 8) utilized for image processing is large enough, the speed of the image processing can be increased by storing the image frequency component 533 in the memory.

<Changing of Interpolation Method>

Next, changing of an interpolation method in the resolution conversion process 541 will be described.

Values Ilow and Imid defined in the following equation are calculated utilizing the above described image frequency component 533 (I(u,v)) in each block and weight coefficients W00 to W33 obtained as appropriately by a visual experiment.

$$Ilow = W00 \cdot I(0,0) + W01 \cdot I(0,1) + W10 \cdot I(1,0) + W11 \cdot I(1,1) + W22 \cdot I(2,2) + W33 \cdot I(3,3) \quad (2)$$

$$Imid = W_{02} \cdot I(0,2) + W12 \cdot I(1,2) + W03 \cdot I(0,3) + W13 \cdot I(1,3) + W20 \cdot I(2,0) + W30 \cdot I(3,0) + W21 \cdot I(2,1) + W31 \cdot I(3,1) + W32 \cdot I(3,2) + W23 \cdot I(2,3) \quad (3)$$

Comparing the two values Ilow and Imid, the state of an image in a subject block is estimated on the basis of its value. For instance, if Ilow≦Imid, it is determined that there is a sharp variance in a horizontal direction or a vertical direction in the image, therefore an interpolation method 542 is utilized to obtain a sharp image. Meanwhile, if Ilow>Imid, it is determined that there is no sharp variance such as an edge or the like in the image, therefore an interpolation method 543 is utilized so that the tone of an entire image smoothly varies.

FIG. 7A shows an example of the interpolation methods 542 and 543. The interpolation method 542 adopts a method (Nearest Neighbor) where a value of a neighboring pixel indicated by ● is utilized as an interpolation pixel indicated by ○. The interpolation method 543 adopts a method (linear approximation) where a value for pixel interpolation is obtained by linear approximation of a neighboring pixel value.

Figure 7B:
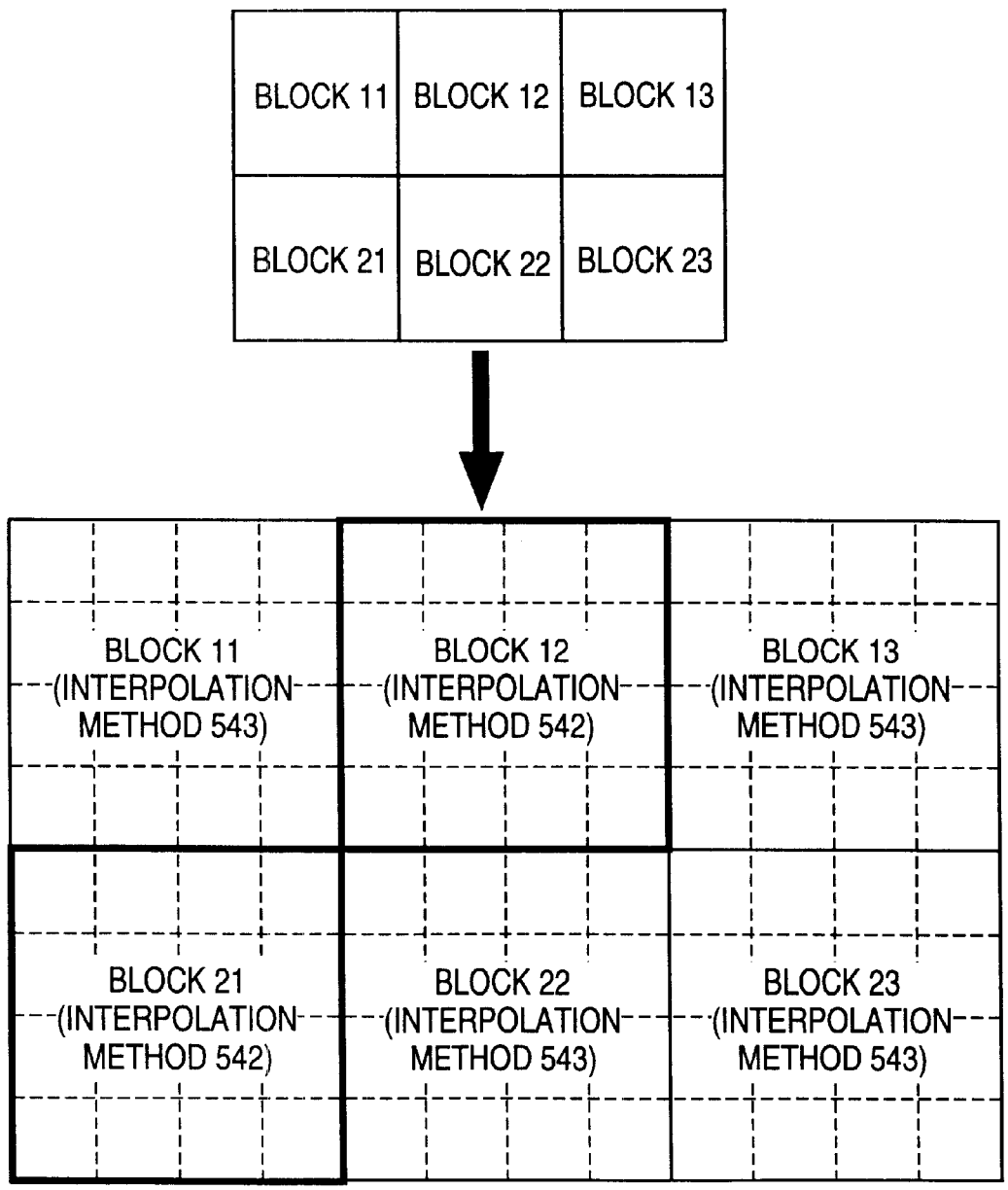
FIG. 7B is a conceptualized diagram showing that interpolation methods applied to each of the blocks differ from each other by changing a method of interpolation.

FIG. 7B is a conceptualized diagram illustrating that an interpolation method applied for each block is different by changing interpolation methods, wherein the interpolation method 542 is applied for the image blocks 12 and 21, and the interpolation method 543 is applied for the blocks 11, 13, 22 and 23.

<Changing of Binarization Method>

Next, changing of a binarization method in the binarization process 545 will be described.

In the binarization process 545, a direct current component I(0,0) of the image frequency component 533 is referred to, and if a block of interest is a monotone block, a dither pattern 546 is selected, otherwise an error diffusion 547 is selected.

Figure 8A:
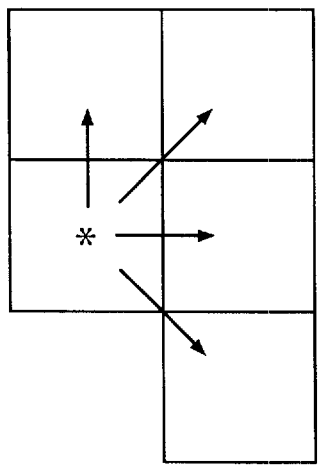
FIG. 8A is a diagram showing an example of error conveying directions in binarization process.
Figure 8B:
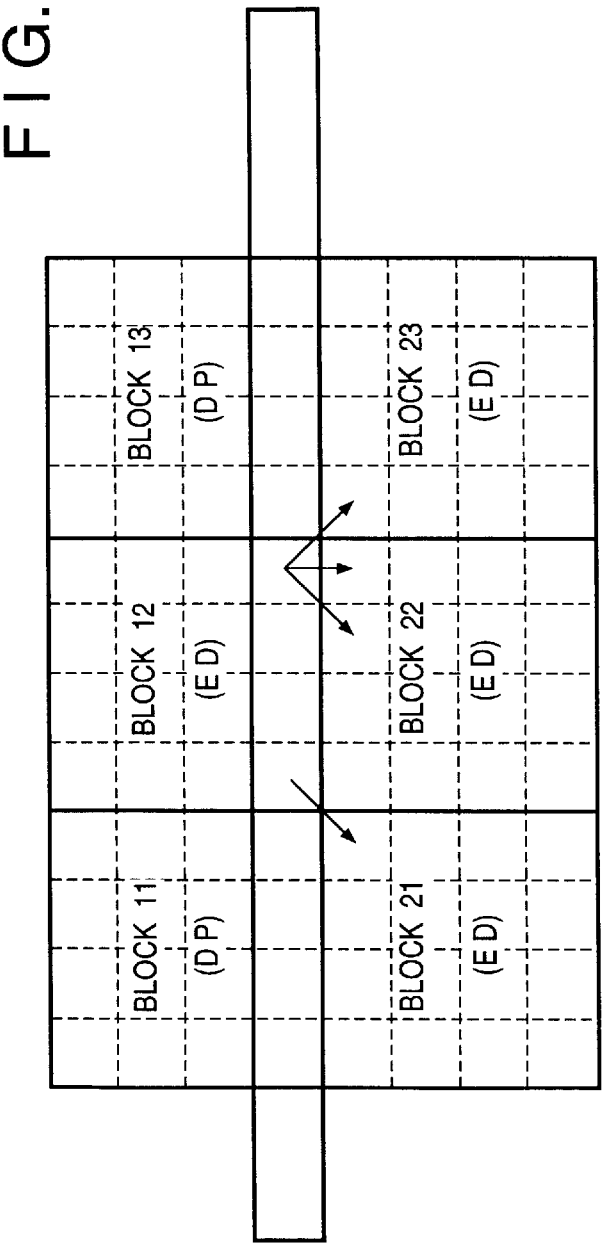
FIG. 8B is a conceptualized diagram showing that binarization methods applied to each of the blocks differ from each other by changing a method of binarization.

FIG. 8B is a conceptualized diagram illustrating that a binarization method applied for each block is different by changing a binarization method, wherein the dither pattern (DP) 546 is applied in the image blocks 11 and 13 since they are monotone blocks, and the error diffusion (ED) 547 is applied for the blocks 12, 21, 22 and 23.

FIG. 8A shows an example of directions to which an error is conveyed. An error of a pixel of interest indicated by "*" is diffused to neighboring pixels in the right (main scanning) direction, the lower (sub scanning) direction, the lower left direction and the lower right direction. In this case, for example, an error in the block 12 where the ED method is applied as shown in FIG. 8B is not conveyed to the block 13 where the DP method is applied, and the error supposedly conveyed to the block 13 is discarded. Instead, the error is conveyed to the lower block 22, the lower left block 21 and the lower right block 23 via a line error buffer.

Note that whether or not a block is a monotone block may be determined by the size of the alternating current component of the frequency component data.

<System Structure>

Figure 9:
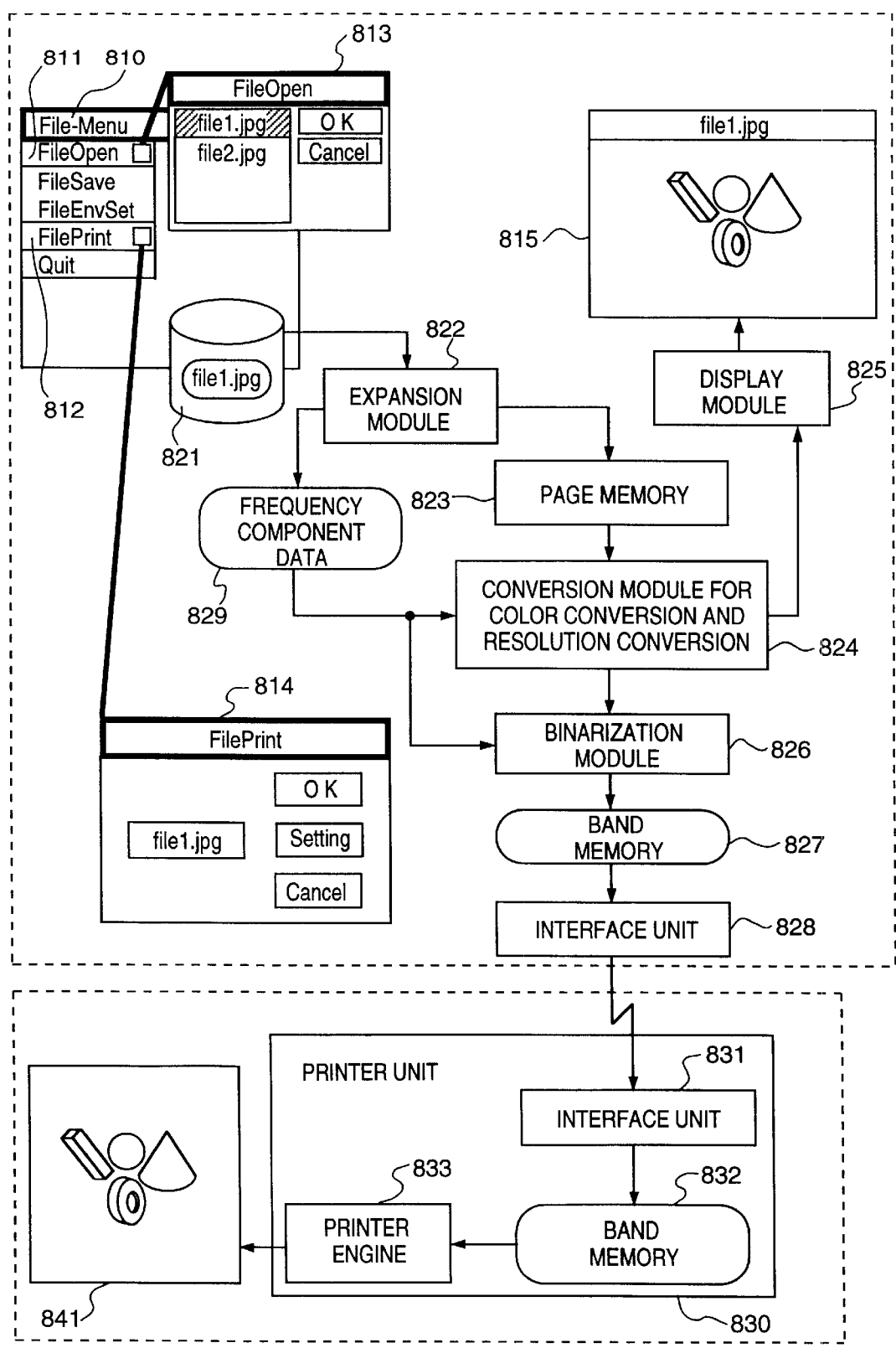
FIG. 9 is a conceptualized block diagram showing image processing in the color image system of the present embodiment utilizing an application software.

FIG. 9 is a conceptualized block diagram showing image processing in the color image system of the present embodiment utilizing an application software.

In FIG. 9, a file operation menu (File-Menu) 810 includes a file-open designation menu (FileOpen) 811 and a file print designation menu (filePrint) 812. When the file-open designation menu 811 is selected, a file-open dialogue (FileOpen) 813 is opened, and the designated file is loaded from a file system 821 by designating a file name listed in the dialogue. Note that when a file is loaded, a window 815 showing an image of the file appears on the display unit. The file operation menu 810 further includes a file-save menu (FileSave), a file environment setting menu (FileEnvSet), a quit menu which instructs quitting of an application and so on.

The processing taking place inside the system is indicated by reference numeral 822 to 825. That is, the designated file "file1.jpg" loaded from the file system 821 is expanded by an expansion module 822 corresponding to an expansion process 520 in FIG. 6, and the expanded image data is temporarily stored in a page memory 823. In addition, frequency component data 829 of the image data is generated and temporarily stored in a memory (not shown). The image data stored in the page memory 823 is reduced (or enlarged) by a resolution conversion module 824 to match with resolution of a display unit, and the reduced (or enlarged) image data is displayed in the window 815 by a display module 825.

Meanwhile, when the image data is to be printed, the image data is displayed by the operation described above, thereafter a user selects the file-open designation menu 812 to open a file-print dialogue (FilePrint) 814. Since the dialog 814 indicates a currently-open file name, depressing an OK button will immediately start printing operation of the image data corresponding to the open file.

The process taking place inside the system is indicated by reference numeral 822 to 829. That is, the image data expanded and stored temporarily in the page memory 823 in the above described processing is mapped in a color space (e.g., from a space for R, G and B to a space for Y, M, C, and K) suitable for printing by color conversion and resolution conversion module 824, which correspond to the color conversion process 532 and the resolution conversion process 541, then enlarged (or reduced) to match with a print resolution on the basis of the frequency component data 829, binarized for each color component by a binarization processing module 826 equivalent to the binarization process 545 in FIG. 6, thereafter stored in a band memory 827.

The image data stored in the band memory 827 is sequentially transmitted to an interface unit 831 in a printer unit 830 by an interface unit 828 and stored in a band memory 832 by the interface unit 831. A printer engine 833 prints a color image print 841 by reading out the image data from the band memory 832 as necessary.

As set forth above, according to the present embodiment, when a compressed image is expanded and outputted, resolution conversion and binarization processing is performed based on the frequency component data of an image obtained in the process of expansion operation. Therefore, it is not necessary to perform an additional process (image-matching processing) such as analyzing of frequency component in a local region of an image, making it possible to obtain a high-quality output image in a short period of time.

Note that when a color output device for outputting binary information, e.g., a ferroelectric liquid crystal display (FLCD) or the like, is utilized as a display in the color image system of the present embodiment, image data expanded and temporarily stored in the page memory 823 by the above described processing is enlarged (or reduced) by the resolution conversion module 824 to match with a resolution of the display in accordance with the frequency component data 829, binarized for each color component by the binarization processing module 826 based on the frequency component data 829 and transmitted to the display module 825, whereby displaying a high quality image in a short period of time as similar to the case of printing operation.

[Second Embodiment]

Hereinafter, an image processing apparatus of a second embodiment according to the present invention will be described. In the second embodiment, the same reference numerals are assigned to compositions identical to those in the first embodiment and detailed descriptions thereof will be omitted.

In the foregoing color image system of the first embodiment, a module for expanding compressed image data, a module for converting resolution and a module for binarization are all independent. Therefore, in order to transfer data between these modules, it is necessary to temporarily generate a data file in a file system or the like. On the other hand, in the color image system according to the second embodiment, these modules are combined to obviate transferring of data between modules, thereby improving the processing speed.

<Outline of Processing>

Figure 10:
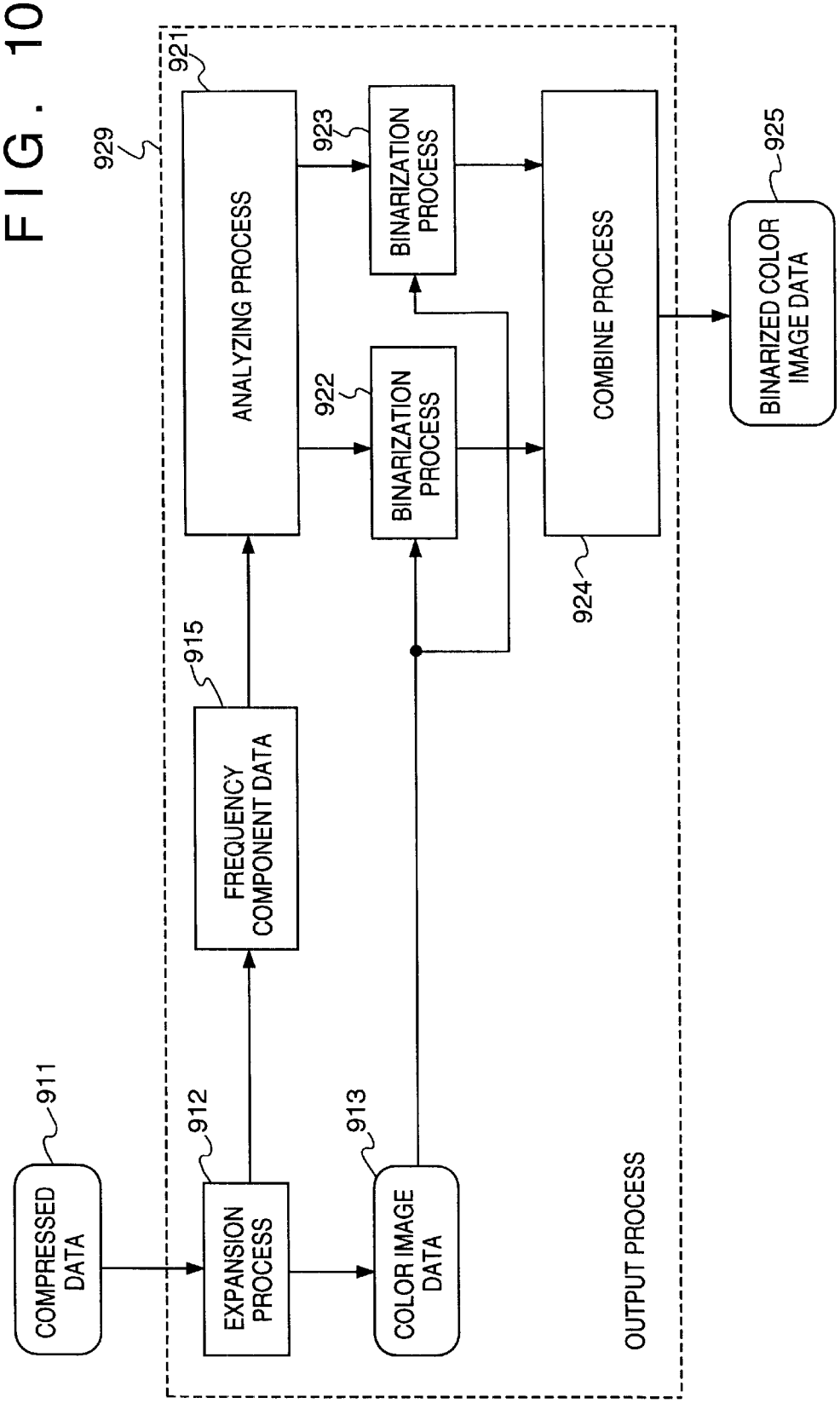
FIG. 10 is a block diagram showing overall image processing in the color image system according to a second embodiment of the present invention.

FIG. 10 is a block diagram showing overall image processing in the color image system according to the second embodiment. Compressed data 911 indicative of compressed color image data is restored into color image data 913 by an expansion process 912, and frequency component data 915 is generated. The frequency component data 915 is input to a unit executing an analyzing process 921, and a binarization process 922 or a binarization process 923 is selectively performed for a specified region (block or the like) in accordance with the analysis result.

By virtue of the binarization process adaptively selected in the above manner, the most appropriate processing for each region is performed on the restored color image data 913. The image data being processed in a unit of a region is combined by combine process 924 and outputted as binarized color image data 925 which corresponds to one page.

Herein, the expansion process 912, analyzing process 921, binarization processes 922 and 923 and combine process 924 are combined into one module as an output process 929.

<Preview Image>

Figure 11:
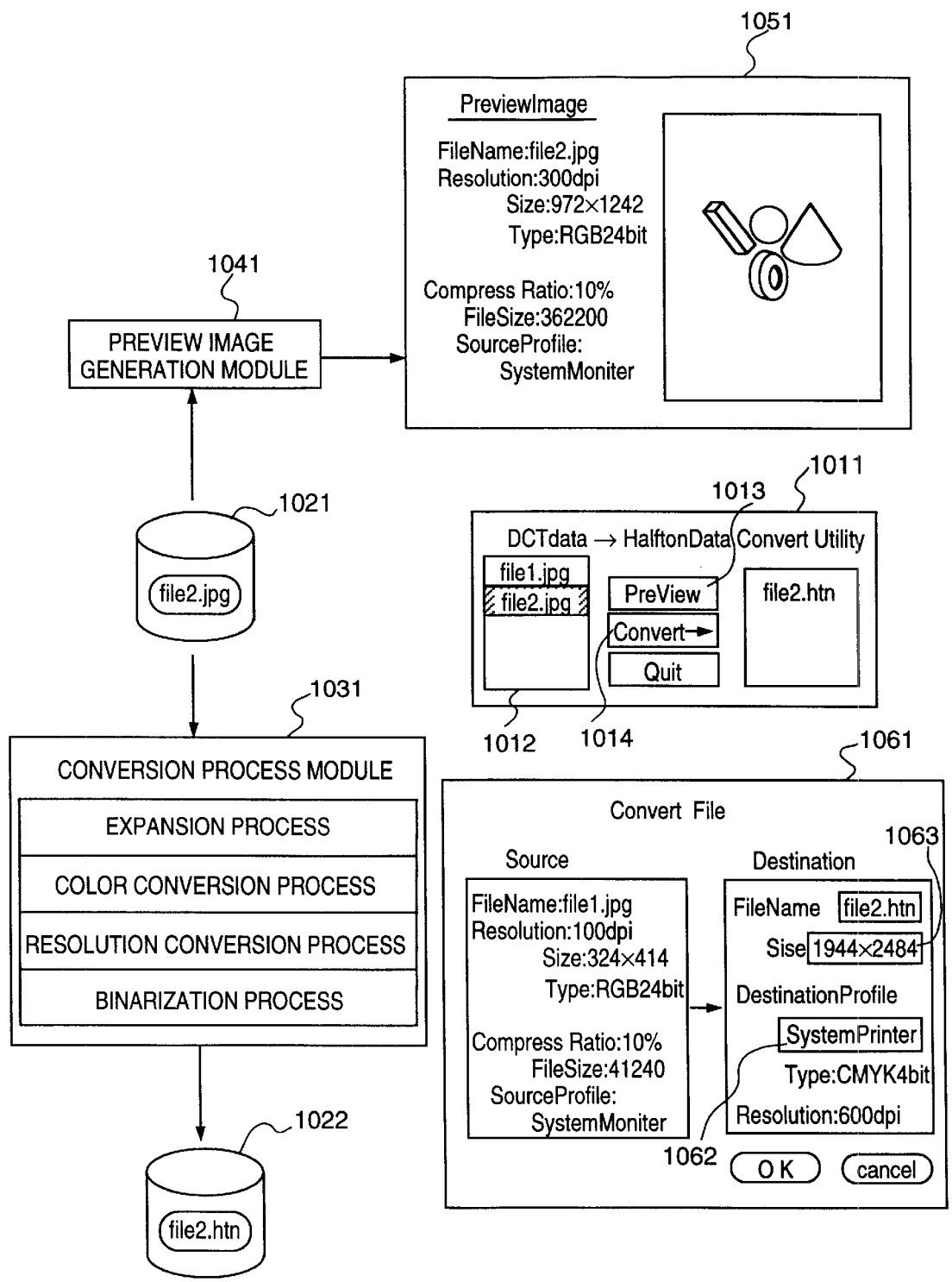
FIG. 11 is a conceptualized diagram showing an example of binarization processing of compressed image data in the image processing apparatus according to the present embodiment.

FIG. 11 is a conceptualized diagram showing an example of binarization processing procedure of compressed image data in the image processing apparatus according to the second embodiment.

In FIG. 11, a file conversion utility window 1011 includes a file list box 1012. When a preview button (PreView) 1013 is depressed after selecting a file listed in the list box (in FIG. 11, "file2.jpg" is selected), the image file "file2.jpg" stored in a file system 1021 is sent to a preview image generation module 1041 and a preview image 1051 is displayed on a display unit. Note that the preview image 1051 includes detailed header information of the image file "file2.jpg" to facilitate selection of an image file.

Figure 12A:
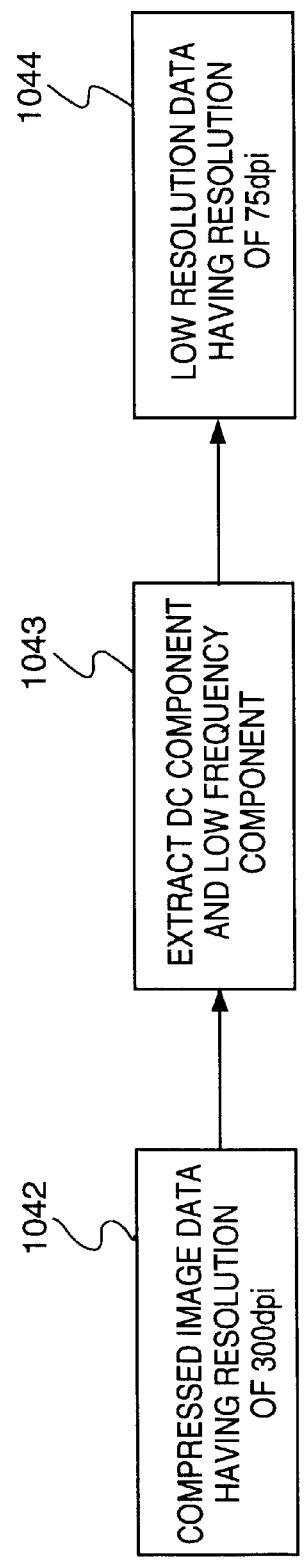
FIG. 12A is a block diagram showing generation of low resolution image data based on compressed image data.

A low resolution image or a reduced image would be sufficient enough for the quality of the preview image, however, the image must be displayed quickly. FIG. 12A shows generation of low resolution image data from compressed image data. The process shown as an example in FIG. 12A is where the DC component and a low-frequency component shown in FIG. 12B are extracted (1043) from compressed image data 1042 having 300 dpi to generate image data having one fourth (75 dpi) of the resolution. Hereinafter, this processing will be briefly explained.

Suppose a function denoting original image data is $i(x, y)$ and the corresponding DCT function is $I(u, v)$. A DCT conversion equation is defined as the above described equation (1). The following equation can be obtained by per forming an inverse DCT conversion utilizing four coefficients I(0,0), I(0,1), I(1,0), and I(1,1) of the equation (4).

$$I(x, y) = \sum_{u=0}^{1}\sum_{v=0}^{1} c(u)c(v)I(u, v) \cdot \cos\{(2x+1)u\pi/2N\} \cdot \cos\{2y+1)v\pi/2N\} \quad (4)$$

where $0 \leq u,v \leq 1$

As a result of the above operation, an 8×8 pixel which constitutes the block is reduced to a 2×2 pixel whereby generating an image having one fourth of the original resolution. Note that the resolution of a display apparatus is generally about 75 dpi. Therefore, the low resolution image obtained in the foregoing manner is displayed without further processing.

<Conversion Processing>

In the file conversion utility window 1011, when a conversion button (Convert→) 1014 is depressed after selecting a file, a file conversion dialogue (ConvertFile) 1061 is displayed. When an OK button of the dialogue 1061 is operated, the image file "file2.jpg" stored in the file system 1021 is sent to a conversion process module 1031 where processing for expansion, color conversion, resolution conversion, binarization and the like which is appropriate for a target output device are performed. An image file "file2.htn" obtained by processing the image "file2.jpg" is stored in a file system 1022. By sending the image file "file2.htn" to an output device such as a printer or the like, a desired image is outputted.

Since a system printer (SystemPrinter) is selected as a default setting of the target output device, an image size, color conversion, the number of bit to be output and the like are automatically set to match with the system printer. To change the target output device, a "DestinationProfile" box 1062 in the file conversion dialogue 1061 is operated thereby selecting a desired output device. If a profile of the selected output device is registered in the system, an image size, color conversion, the number of bit to be output and the like are automatically set to match with the output device.

To change the image size, a "Size" box 1063 in the file conversion dialogue 1061 is operated to select a desired size; alternatively, a size is inputted from a keyboard (not shown) or the like.

[Third Embodiment]

An image processing apparatus of the third embodiment according to the present invention will now be described. In the third embodiment, the same reference numerals are assigned to compositions identical to those in the first embodiment and detailed descriptions thereof will be omitted.

The third embodiment is provided to improve the speed of the process, as similar to the second embodiment. In the apparatus of the third embodiment, each of the processes for expansion of compressed image data, color conversion, resolution conversion and binarization is performed by a single device. In the following description, a printer apparatus comprising processing units for performing the above processes will be described. It is however also possible to supply the processing units as a card mounted on a print circuit board to be embodied in a printer or a personal computer or the like, alternatively a dedicated image processing apparatus may be supplied.

<Preview Image>

Figure 13:
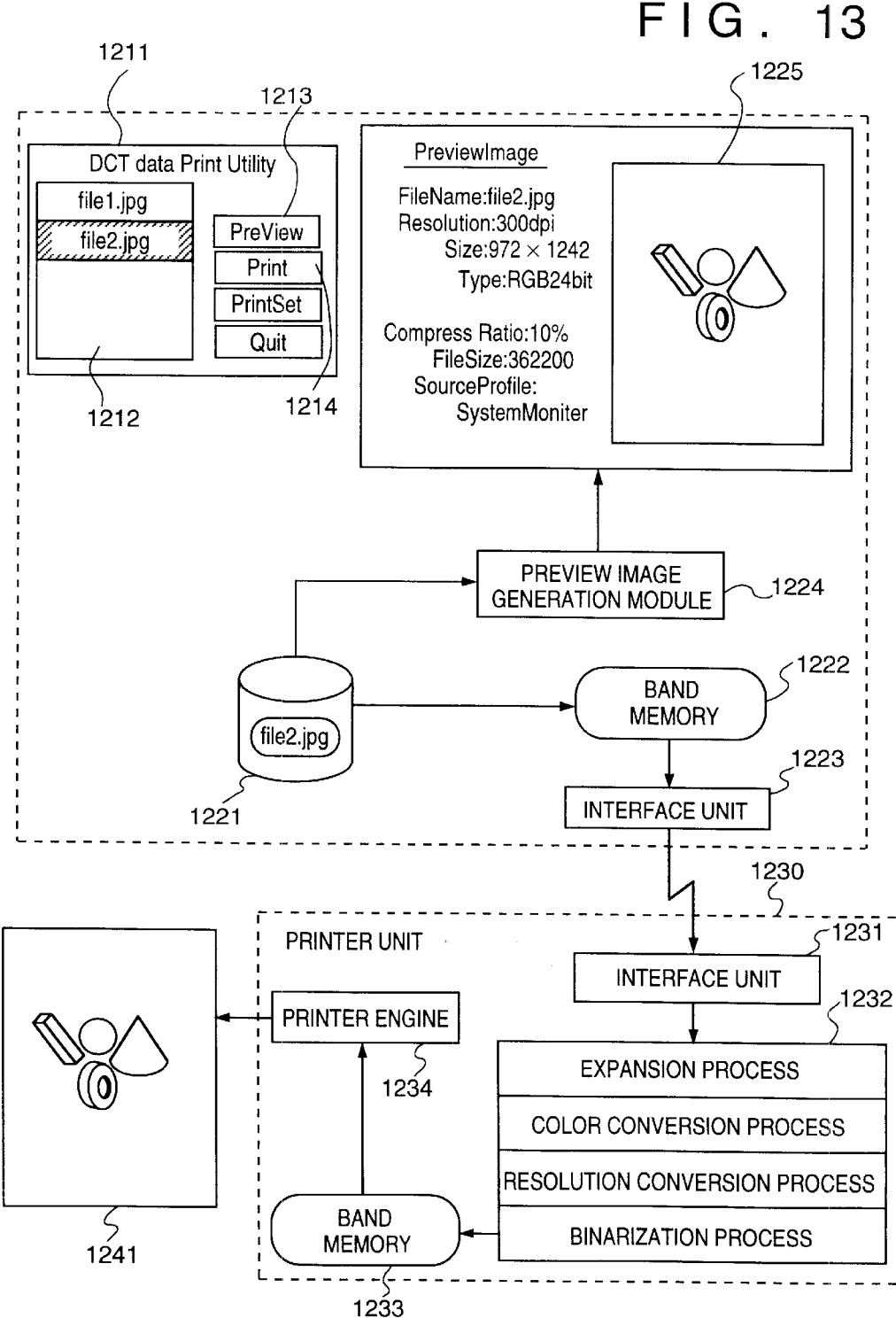
FIG. 13 is a conceptualized block diagram showing a structure of an image processing system according to a third embodiment of the present invention and a process of compressed image data being expanded, binarized and outputted.

FIG. 13 is a conceptualized block diagram showing a structure of an image processing system according to the third embodiment of the present invention and a process of compressed image data being expanded, binarized and outputted.

In FIG. 13, a file selection window 1211 includes a file list box 1212. When a preview button (PreView) 1213 is depressed after selecting a file listed in the box, the image file e.g., "file2.jpg" stored in a file system 1221 is sent to a preview image generation module 1224 and a preview image 1225 is displayed. Note that the preview image 1225 includes detailed header information of the image file "file2.jpg" to facilitate selection of an image file.

<Output Processing>

In the file selection window 1211, when a print button (Print) 1214 is depressed upon selection of a file, image file data e.g., "file2.jpg" stored in the file system 1221 is sequentially transferred to a band memory 1222 and further transferred to a printer unit 1230 via an interface unit 1223.

An interface unit 1231 of the printer unit 1230 sequentially transmits the received data to a conversion process unit 1232. The conversion process unit 1232 performs processing for expansion, color conversion, resolution conversion, binarization and the like on the inputted data in high speed, and stores the obtained binarized image data in a band memory 1233. A printer engine 1234 generates a printout 1241 by reading image data out of the band memory 1233.

[Fourth Embodiment]

An image processing apparatus of a fourth embodiment according to the present invention will be described below. In the fourth embodiment, the same reference numerals are assigned to compositions identical to those in the first embodiment and detailed descriptions thereof will be omitted.

Figure 14:
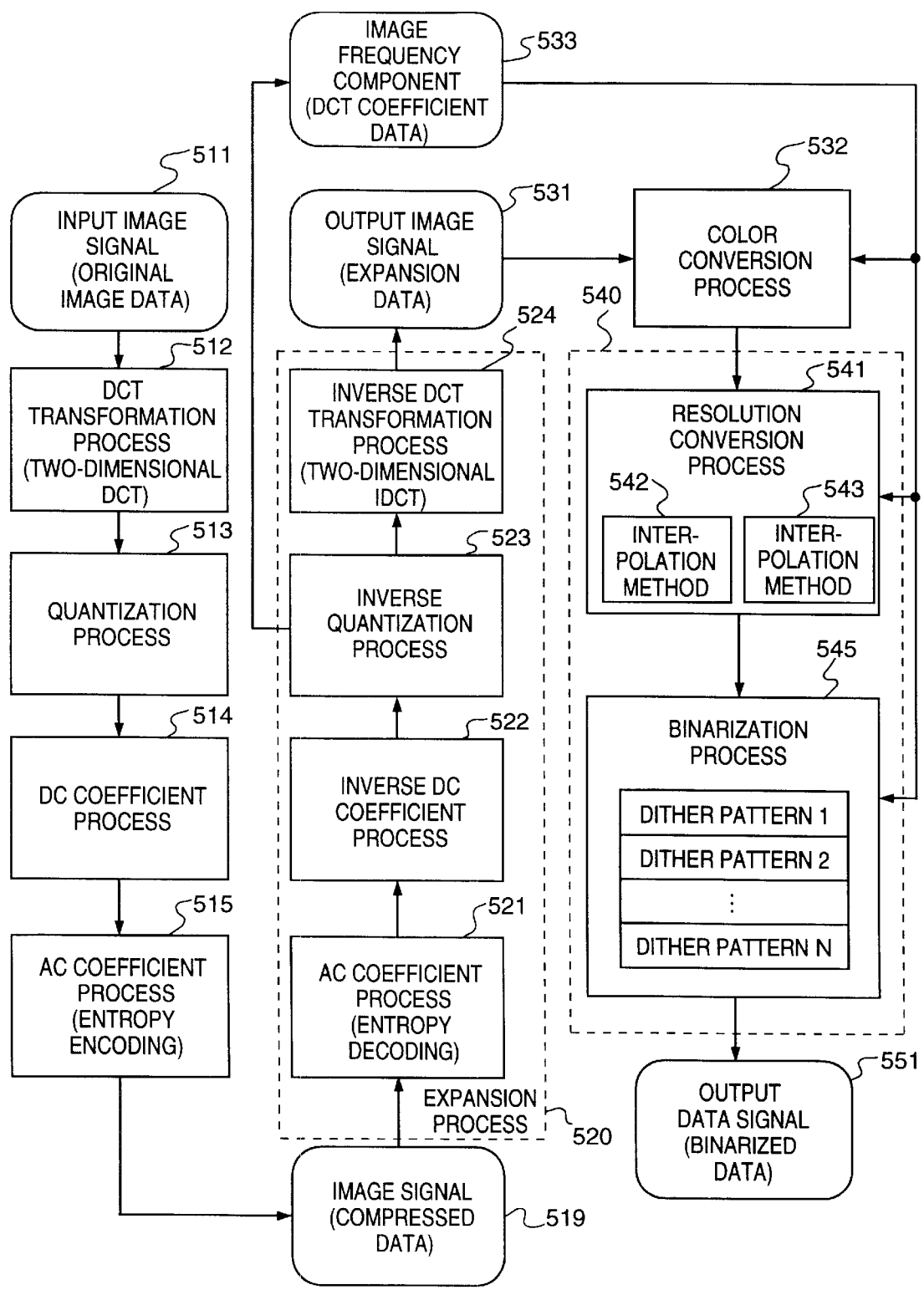
FIG. 14 is a functional block diagram showing an example of image processing by a color image system according to a fourth embodiment of the present invention.

In the fourth embodiment, not only the resolution conversion method and the binarization method, but also a color conversion method is changed in accordance with the image frequency component 533, as shown in FIG. 14. Moreover, in the binarization process, a plurality of different dither patterns are selectively utilized in accordance with the image frequency component 533, instead of changing between the dither pattern method and the error diffusion method.

<Changing of Color Conversion Method>

Changing of a color conversion method in the color conversion process 532 is now described.

In the color conversion process 532, four frequency components I(0,0), I(0,1), I(1,0) and I(1,1) are referred to, and a color conversion method (color matching method) is changed in accordance with a state of the pattern of the frequency components. For instance, in case of a monotone block, an image in the block is highly likely to be a computer graphic image (CG image). In consideration of the fact that the CG image is generated on a color monitor, a color conversion parameter appropriate for a color monitor is utilized. When a user knows the characteristics of the color monitor used, a color conversion parameter which matches the characteristics is utilized, as a matter of course.

If density variance of pixels in the block is high (high-frequency components are included), the image is highly likely to be a natural image; therefore, a color conversion parameter appropriate for a natural image is utilized.

Although the changing of the color conversion parameter may be performed for each block, a region in which plural units of M×N (e.g., 4×4 block) blocks are combined may be newly defined to change the parameter.

Further, depending upon whether the image is a CG image or a natural image, the color space compression pursuing colorfulness or the color space compression pursuing perception may be selectively performed at the time of color space compressing operation.

<Changing of Binarization Method>

Next, changing of a binarization method in the binarization process 545 will be described.

Figure 15A:
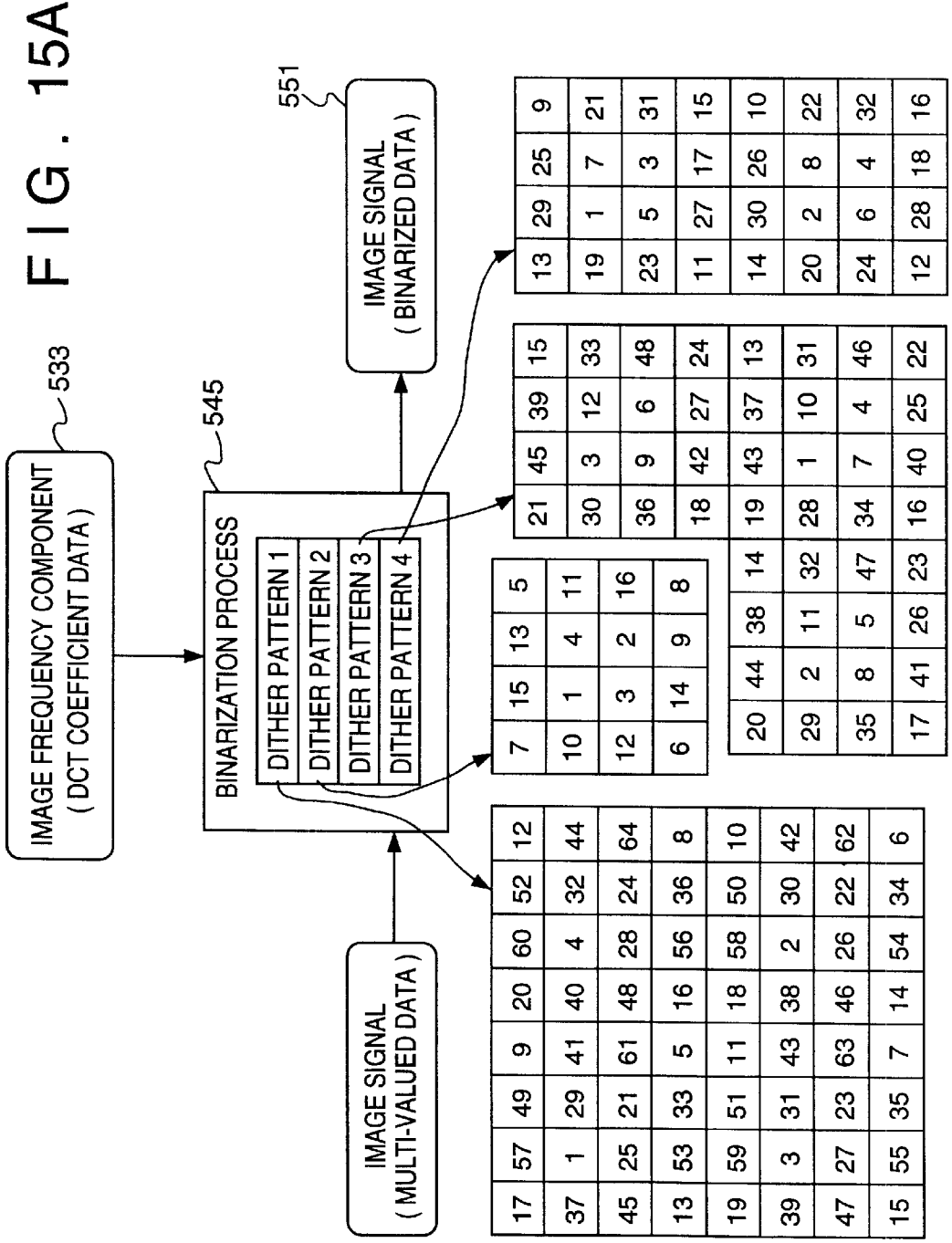
FIG. 15A is a diagram for explaining binarization processing utilized in the present embodiment.

As shown in FIG. 15A, four frequency components I(0,0), I(0,1), I(1,0) and I(1,1) are referred to in the binarization process 545, whereupon an appropriate dither pattern is selected from dither patterns 1 to 4 in accordance with the state of the pattern of the frequency components to perform binarization. Note that the dither patterns are not limited to those four patterns shown in FIG. 15A, but an arbitrary number of arbitrary dither patterns can be utilized.

FIG. 15B is a diagram showing generation of the most appropriate image in each block by a dither pattern being selected and combined.

In FIG. 15B, since the blocks 11, 13 and 23 are monotone blocks, the dither pattern 1 is selected. Although the block 22 is not a monotone block, density variance is minor; thus the dither pattern 1 is selected.

Meanwhile, in the block 12, a dither pattern is rearranged by combining a non-rectangular dither pattern 3 and a rectangular dither pattern 2, whereby generating a binarized image in the block 12. In the block 21, a dither pattern is rearranged by combining two dither patterns 2 and 4 whose sizes are different, whereby generating a binarized image in the block 21.

<Summary>

As set forth above, in order to generate high quality image, an additional step (image-matching processing), such as analyzing of frequency component in a partial region of a processing image, is necessary. Although such step raises a problem of extremely long processing time, by virtue of the foregoing embodiments, quality of an output image can be improved and the processing time can be reduced at the time of expanding and outputting compressed image data.

According to each of the above described embodiments, the time necessary for the image-matching processing can be reduced by utilizing frequency component data obtained by the above described DCT conversion, thereby attaining a high quality image and achieving reduction of processing time.

Figure 16:
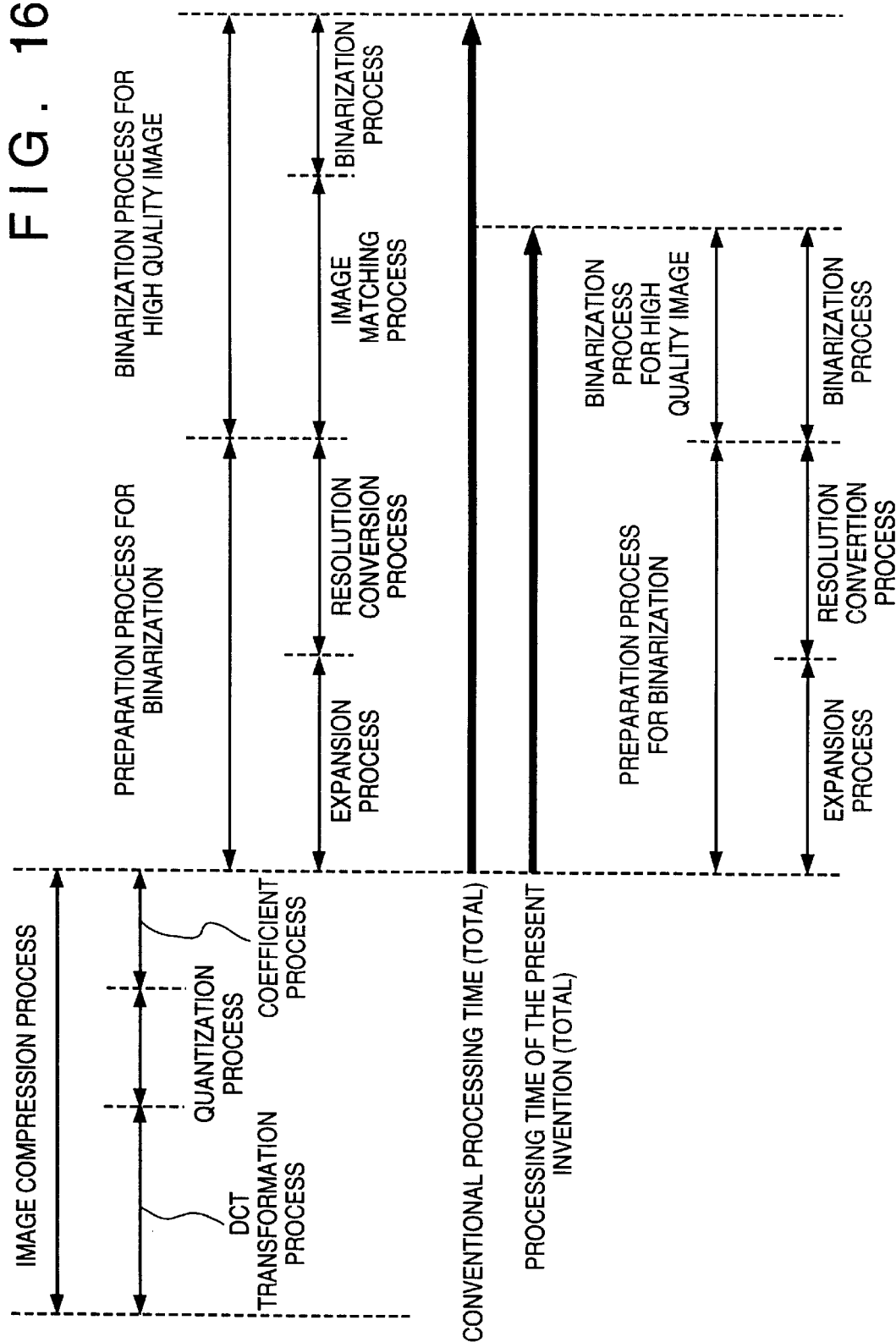
FIG. 16 is a chart showing how the time required for image-matching processing is reduced in the present embodiment.

FIG. 16 shows how the time required for image-matching processing is reduced. The chart shows the time required for executing each process.

As shown in FIG. 16, conventionally the series of processing have been sequentially performed in the order of expansion, resolution conversion, image-matching, and binarization. However in the present invention, processing for expansion, resolution conversion, and binarization is performed, omitting the image-matching process. Therefore, the time necessary for the image-matching process can be excluded, reducing the entire processing time.

Further, when each process of expansion, resolution conversion and binarization is independently executed, opening/closing operation of an image data file, input/output operation of the data and the like is necessary for each process. Therefore, the number of times the file system being accessed is increased, resulting in reducing the processing speed of the entire process. In the foregoing second and third embodiments, these processes are combined together so that opening/closing operation of the image data file is performed only once, and that input/output operation of the data is necessary only for the amount of data corresponding to one image. Accordingly, fast processing can be realized.

[Other Embodiments]

Note that the present invention can be applied to a system constituted by a plurality of devices (e.g., a host computer, an interface unit, a reader, a printer or the like) or to an apparatus comprising a single device (e.g., a copy machine, facsimile apparatus, or the like).

Furthermore, the object of the present invention can be attained by supplying a storing medium (e.g., disk 14 in FIG. 1) storing program codes of a software which realizes the function of the present embodiment, to a system or an apparatus (e.g., computer 1 in FIG. 1), and by the system or a computer (or CPU or MPU) of the apparatus reading and executing the program codes stored in the storing medium. In this case, the program codes read from the storing medium realize the above described functions of the present embodiments and the storing medium storing the program codes constitutes the present invention. As a storing medium for supplying program codes, for example, a floppy disk, hard disk, optical disk, magneto optical disk, CD-ROM, CD-R, a magnetic tape, a non-volatile memory card, a ROM and the like can be utilized.

Furthermore, by the computer executing the read-out program codes, not only the above described functions of the present embodiments are realized, but also an OS or the like operated on the computer executes a part of or the entire processing based on instructions of the program codes, thereby realizing the functions according to the present embodiments.

Moreover, after the program codes read from the storing medium is written in a function extension card inserted into a computer, or in a memory embodied in a function extension unit connected to the computer, a CPU included in the function extension card or the function extension unit performs a part of or the entire processing, thereby realizing the functions according to the present embodiments.

Figure 17:
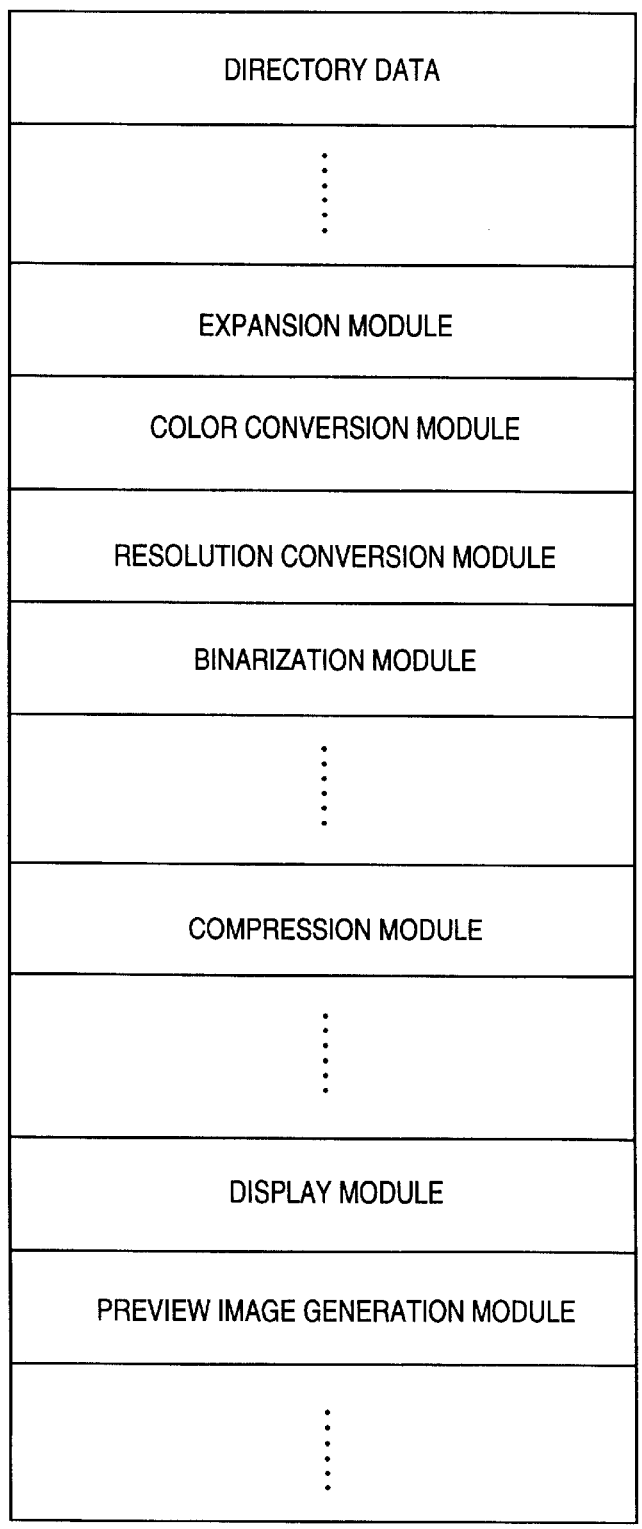
FIG. 17 is a diagram showing an example of a memory map in a memory medium storing program codes according to the present invention.

When the present invention is applied to the above described storing medium, a program code corresponding to the foregoing flowchart is stored in the storing medium. More particularly, each module shown in the memory map in FIG. 17 is stored in the storing medium. In other words, at least the program codes for each of the "expansion" module, "resolution conversion" module and "binarization" module needs to be stored in the storing medium. Note that each of the "expansion," "color conversion," "resolution conversion" and "binarization" modules may be combined to a "conversion processing module."

Further, in application of the present invention, an image block is not limited to a rectangle, but may be a substantially hexagon, or each block may have an irregular size and a shape, and may overlap with neighboring blocks. A method of resolution conversion or binarization is not limited, as long as the method enables to generate a high-quality image by appropriately changing a method in accordance with a frequency component of an image.

Furthermore, the expansion means for expanding coded image data does not necessarily have to include a reproduction function of an original image, but may be configured such that necessary information is obtained from the coded data to perform the least-required processing. For instance, the image data may be decoded into an intermediate code without being reproduced. Therefore, the expansion means according to the present invention is not the type of processing means distinguished by whether or not an original image is partially or temporarily generated in the entire process (the expansion means according to the present invention does not necessarily produce an original image partially or temporarily, by its processing). In other words, even if an original image is not reproduced, as long as frequency data of an image is utilized in its processing, the concept of the present invention is adopted. For instance, instead of generating an image file by binarizing an image obtained by expanding a compressed file including a compressed original image, a case where a binarized image file is directly generated from a compressed file, is also considered as adoption of the concept according to the present invention.

Moreover, in each of the foregoing embodiment, the descriptions are given for an example where color image data is outputted to a color output device for outputting binary information (e.g. ink-jet color printer or ferroelectric liquid crystal display (FLCD)), therefore output data needs to be binarized. However in the present invention, it is not limited to binarization, but a color-depth of data can be changed to an arbitrary value. For instance, the present invention can be applied to a case where full-color coded image data is expanded, converted to index color data where each of the R, G, and B colors has 8 bit or 4 bit (i.e. octal representation or quaternary representation), based upon obtained image frequency component data, thereafter re-encoded as necessary and stored in a storing medium or transmitted via a transmission path.

The concepts exemplified in each of the above embodiments can be arbitrarily combined to realize an apparatus.

Accordingly, as set forth above, the present invention provides an image processing apparatus and method thereof which can obtain high-quality image data in short period of time.

The present invention is not limited to the above embodiments and various changes and modifications can be made within the spirit and scope of the present invention. Therefore, to appraise the public of the scope of the present invention, the following claims are made.

What is claimed is:

1. An image processing apparatus comprising:

a data expander, arranged to expand coded image data to output expanded image data, and to generate and output frequency component data indicative of frequency characteristics of an image represented by the expanded image data, during the expanding of the coded image data;

a memory, arranged to store the frequency component data outputted by said data expander; and a color conversion processor, arranged to perform color conversion processing on the expanded image data outputted by said data expander, wherein the color conversion processing is controlled based upon a pattern of the frequency component data corresponding to the expanded image data to be processed by said color conversion processor.

2. The image processing apparatus according to claim 1, wherein said color conversion processing includes color matching processing.

3. The image processing apparatus according to claim 1, wherein said frequency component data corresponds to orthogonal transformation coefficients obtained by the processing of said data expander.

4. An image processing method comprising the steps of:

expanding coded image data in a data expander to output expanded image data from the data expander, and generating and outputting from the data expander frequency component data indicative of frequency characteristics of an image represented by the expanded image data, during the expanding of the coded image data;

storing in a memory the frequency component data outputted by the data expander during said expanding step; and performing color conversion processing on the expanded image data outputted by the data expander in said expanding step, wherein the color conversion processing is controlled based upon a pattern of the frequency component data corresponding to the expanded image data to be processed by said color conversion processor.

5. A computer program product comprising a computer-usable medium having computer-readable program code means embodied in said medium for an image processing method, said product including:

first computer-readable program code for expanding coded image data in a data expander to output expanded image data from the data expander, and generating and outputting from the data expander frequency component data indicative of frequency characteristics of an image represented by the expanded image data, during the expanding of the coded image data;

second computer-readable program code for storing in a memory the frequency component data outputted from the data expander during the expanding of the coded image data; and third computer-readable program code for performing color conversion on the expanded image data outputted by the data expander in the expanding of the coded image data, wherein the color conversion is controlled based on a pattern of the frequency component data corresponding to the expanded image data to be processed by said color conversion processor.

* * * * *

UNITED STATES PATENT AND TRADEMARK OFFICE
CERTIFICATE OF CORRECTION

PATENT NO.    : 6,587,222 B2
DATED         : July 1, 2003
INVENTOR(S)   : Naoyuki Nishikawa It is certified that error appears in the above-identified patent and that said Letters Patent is hereby corrected as shown below:

Title page,
Item [56], References Cited, U.S. PATENT DOCUMENTS, insert
-- 5,258,829    11/1993    Matsunaga et al.
   5,422,736    6/1995     Katayama
   5,489,998    2/1996     Yamada et al.
   5,875,044    2/1999     Seto et al. --

Column 8,
Line 64, "(filePrint)" should read -- (FilePrint) --.

Column 10,
Line 67, "per" should read -- per- --.

Column 12,
Line 48, "-appropriate" should read -- appropriate --.

Column 15,
Line 1, "embodiment," should read -- embodiments, --.

Signed and Sealed this

Eleventh Day of May, 2004

JON W. DUDAS
*Acting Director of the United States Patent and Trademark Office*

UNITED STATES PATENT AND TRADEMARK OFFICE
CERTIFICATE OF CORRECTION

PATENT NO. : 6,587,222 B2 Page 1 of 1
DATED : July 1, 2003
INVENTOR(S) : Naoyuki Nishikawa It is certified that error appears in the above-identified patent and that said Letters Patent is hereby corrected as shown below:

<u>Title page,</u>
Item [56], References Cited, U.S. PATENT DOCUMENTS, insert:
--5,258,829   11/1993   Matsunaga et al.
  5,422,736   6/1995    Katayama
  5,489,998   2/1996    Yamada et al.
  5,875,044   2/1999    Seto et al. --

<u>Column 8,</u>
Line 64, "(filePrint)" should read -- (FilePrint) --.

<u>Column 10</u>
Line 67, "per" should read -- per --.

<u>Column 12,</u>
Line 48, "-appropriate" should read -- appropriate --.

<u>Column 15</u>
Line 1, "embodiment," should read -- embodiments, --.

Signed and Sealed this

Third Day of August, 2004

JON W. DUDAS
*Acting Director of the United States Patent and Trademark Office*